US012123366B2

(12) United States Patent
Oryoji et al.

(10) Patent No.: US 12,123,366 B2
(45) Date of Patent: Oct. 22, 2024

(54) INTERNAL COMBUSTION ENGINE CONTROL DEVICE

(71) Applicant: Hitachi Astemo, Ltd., Hitachinaka (JP)

(72) Inventors: Kazuhiro Oryoji, Tokyo (JP); Yoshihiko Akagi, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 115 days.

(21) Appl. No.: 18/008,621

(22) PCT Filed: May 13, 2021

(86) PCT No.: PCT/JP2021/018151
§ 371 (c)(1),
(2) Date: Dec. 6, 2022

(87) PCT Pub. No.: WO2022/034721
PCT Pub. Date: Feb. 17, 2022

(65) Prior Publication Data
US 2023/0220807 A1 Jul. 13, 2023

(30) Foreign Application Priority Data
Aug. 11, 2020 (JP) ................................ 2020-135719

(51) Int. Cl.
*F02D 35/02* (2006.01)
*F02D 29/02* (2006.01)

(52) U.S. Cl.
CPC ........... *F02D 35/026* (2013.01); *F02D 29/02* (2013.01); *F02D 35/027* (2013.01);
(Continued)

(58) Field of Classification Search
CPC ......... F02D 2200/021; F02D 2200/022; F02D 2200/0404; F02D 2200/0406;
(Continued)

(56) References Cited

U.S. PATENT DOCUMENTS 7,392,129 B2 * 6/2008 Hill ..................... F02D 41/1467 123/480
10,626,808 B2 * 4/2020 Eser ...................... F02D 35/026
(Continued)

FOREIGN PATENT DOCUMENTS

JP 2006-342680 A 12/2006
JP 2011-132898 A 7/2011
(Continued)

OTHER PUBLICATIONS

240524_JP2014156849A_machine_translation.pdf (Year: 2014).*
(Continued)

*Primary Examiner* — Carl C Staubach
(74) *Attorney, Agent, or Firm* — Crowell & Moring LLP

(57) ABSTRACT

An internal combustion engine control device includes an engine state estimation unit, a wall surface temperature estimation unit, and an operation amount calculation unit. The engine state estimation unit calculates the energy transfer amount from the gas to the wall surface based on the parameter related to the operating condition, the parameter related to the chemical condition of combustion, and the parameter related to an operation status. The wall surface temperature estimation unit estimates the wall surface temperature on the basis of the energy transfer amount from the gas to the wall surface. The operation amount calculation unit calculates an operation amount of an actuator provided in the internal combustion engine on the basis of the wall surface temperature estimated by the wall surface temperature estimation unit.

14 Claims, 18 Drawing Sheets

(52) U.S. Cl.
CPC .................. *F02D 2200/022* (2013.01); *F02D 2200/0404* (2013.01); *F02D 2200/0406* (2013.01); *F02D 2200/0414* (2013.01); *F02D 2200/0418* (2013.01); *F02D 2200/0602* (2013.01); *F02D 2200/101* (2013.01)

(58) Field of Classification Search
CPC ..... F02D 2200/0414; F02D 2200/0418; F02D 2200/0602; F02D 2200/101; F02D 29/02; F02D 35/025; F02D 35/026; F02D 35/027; F02D 41/18
See application file for complete search history.

(56) References Cited

U.S. PATENT DOCUMENTS

| | | | | |
|---|---|---|---|---|
| 11,542,884 | B2 * | 1/2023 | Goodall | F02D 41/3005 |
| 11,898,508 | B2 * | 2/2024 | Matohara | F02D 41/0052 |
| 2004/0181331 | A1 * | 9/2004 | Nagaishi | F02D 35/025<br>60/285 |
| 2005/0188954 | A1 * | 9/2005 | Yoshino | F02P 5/153<br>123/406.29 |
| 2005/0197762 | A1 * | 9/2005 | Yoshino | F02D 35/026<br>701/111 |
| 2007/0044781 | A1 * | 3/2007 | Nakayama | F02D 35/026<br>123/585 |
| 2009/0097525 | A1 * | 4/2009 | Ibuki | F02D 35/026<br>374/144 |
| 2011/0155097 | A1 * | 6/2011 | Matsumura | F02D 41/401<br>123/299 |
| 2017/0184019 | A1 * | 6/2017 | Imaeda | F02D 41/009 |
| 2019/0285008 | A1 * | 9/2019 | Yoneya | F02D 35/023 |
| 2020/0332759 | A1 * | 10/2020 | Oryoji | F02P 5/1523 |

FOREIGN PATENT DOCUMENTS

| | | | |
|---|---|---|---|
| JP | 2013-19350 | A | 1/2013 |
| JP | 2013-64374 | A | 4/2013 |
| JP | 2013-204521 | A | 10/2013 |
| JP | 2014-156849 | A | 8/2014 |
| JP | 2016-98669 | A | 5/2016 |
| JP | 2017-172483 | A | 9/2017 |
| JP | 2018-66268 | A | 4/2018 |
| JP | 2019-148185 | A | 9/2019 |
| WO | WO 2016/084187 | A1 | 6/2016 |
| WO | WO 2019/176270 | A1 | 9/2019 |

OTHER PUBLICATIONS

International Search Report (PCT/ISA/210) issued in PCT Application No. PCT/JP2021/018151 dated Jun. 29, 2021 with English translation (six (6) pages).

Japanese-language Written Opinion (PCT/ISA/237) issued in PCT Application No. PCT/JP2021/018151 dated Jun. 29, 2021 (five (5) pages).

* cited by examiner

INTERNAL COMBUSTION ENGINE CONTROL DEVICE

TECHNICAL FIELD

The present invention relates to an internal combustion engine control device.

BACKGROUND ART

Normally, an internal combustion engine mounted on a vehicle operates according to operation amounts of various actuators adapted under specific environmental conditions such as temperature, humidity, and atmospheric pressure. For example, when traveling on an actual road, there is a case where the vehicle travels under a condition deviating from an environmental condition assumed at the time of adaptation or an operating condition of the internal combustion engine. This environmental condition is detected using various sensors, and the operation amount is corrected according to the detected condition.

In addition, during actual road travel, not only the environmental conditions but also the state of the internal combustion engine itself (e.g. wall temperature, coolant temperature, parts) changes and deviates from the state assumed at the time of adaptation. For this reason, in order to improve various performances (fuel consumption performance and exhaust performance) of the automobile when the automobile travels on the actual road, it is important to grasp the operating state by estimating and detecting the state of the internal combustion engine and to operate the actuator according to the grasped state of the internal combustion engine.

As a state related to performance of the internal combustion engine, there is a temperature (hereinafter, wall surface temperature) of a wall of a combustion chamber of the internal combustion engine. The wall surface temperature is a physical quantity related to the operation amount of the actuator that affects the fuel consumption performance and the exhaust performance. For example, under a condition where the wall surface temperature is high, the heating of the gas near the wall surface proceeds, so that abnormal combustion (knocking) is likely to occur. On the other hand, under a condition where the wall surface temperature is low, the fuel adhering to the wall surface tends to remain as a liquid, which may lead to generation of unburned hydrocarbon and soot, leading to deterioration of exhaust performance. Therefore, in order to operate various actuators provided in the internal combustion engine, it is required to improve the estimation accuracy of the wall surface temperature.

As a technique for estimating a wall surface temperature and controlling an actuator provided in an internal combustion engine, for example, there is a technique as described in PTL 1. PTL 1 describes a technique of estimating a wall surface temperature from a wall surface temperature map around a load state, a rotational speed, and a coolant temperature and operating an oil jet.

CITATION LIST

Patent Literature

PTL 1: JP 2013-64374 A

SUMMARY OF INVENTION

Technical Problem

However, in the technique described in PTL 1, it has been confirmed that the estimation error of the wall surface temperature is deteriorated in a state where the engine block is cooled, that is, in a state where the temperature of the coolant for cooling the engine block is lowered. Therefore, the technique described in PTL 1 has a problem that the operation amounts of various actuators cannot be appropriately controlled due to deterioration of the estimated value of the wall surface temperature.

An object of the present invention is to provide an internal combustion engine control device capable of improving estimation accuracy of a wall surface temperature in consideration of the above problems.

Solution to Problem

In order to solve the above problems and achieve the object, an internal combustion engine control device includes an engine state estimation unit, a wall surface temperature estimation unit, and an operation amount calculation unit. The engine state estimation unit calculates an energy transfer amount from the gas in the internal combustion engine to the wall surface based on the parameter related to the operating condition of the internal combustion engine, the parameter related to the chemical condition of combustion, and the parameter related to the operation status of the internal combustion engine. The wall surface temperature estimation unit estimates the wall surface temperature based on the energy transfer amount from the gas to the wall surface calculated by the engine state estimation unit. The operation amount calculation unit calculates an operation amount of an actuator provided in the internal combustion engine on the basis of the wall surface temperature estimated by the wall surface temperature estimation unit.

Advantageous Effects of Invention

According to the internal combustion engine control device having the above configuration, it is possible to improve the estimation accuracy of a wall surface temperature.

BRIEF DESCRIPTION OF DRAWINGS

FIG. 5 illustrates a map of a combustion period with a dilution degree and an ignition timing as axes, in which

FIG. 6 is a map illustrating an energy transfer ratio to a wall surface, in which

DESCRIPTION OF EMBODIMENTS

Figure 1:
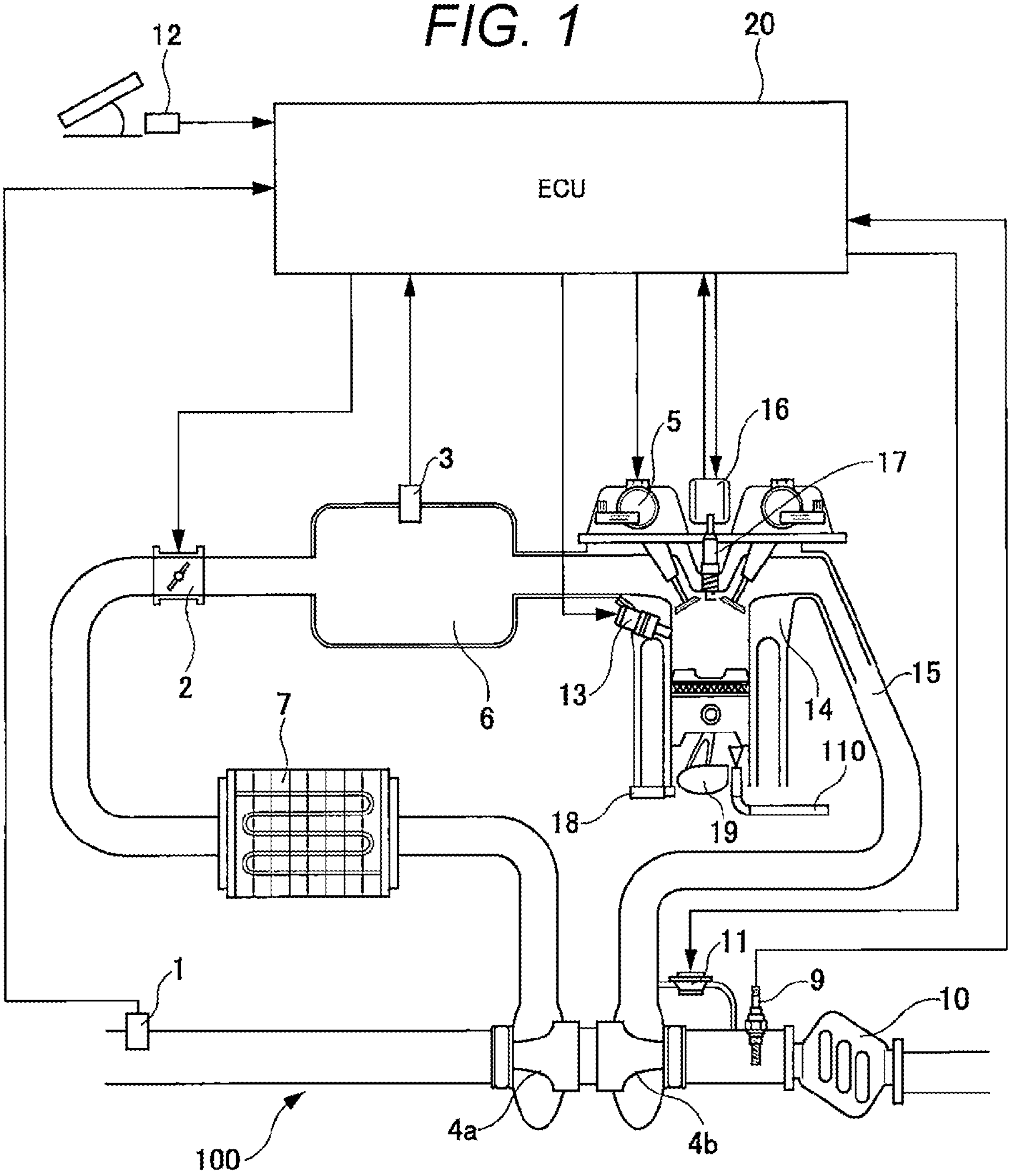
FIG. 1 is a schematic configuration diagram illustrating a system configuration of an internal combustion engine on which an internal combustion engine control device according to a first embodiment is mounted.

Hereinafter, an embodiment of an internal combustion engine control device will be described with reference to FIGS. 1 to 18. The common members in each drawing are designated by the same reference numerals.

1. First Embodiment

First, an internal combustion engine control device according to a first embodiment (hereinafter, referred to as "present example") will be described with reference to FIGS. 1 to 10. FIG. 1 is a schematic configuration diagram illustrating a system configuration of an internal combustion engine.

1-1. Configuration Example of Internal Combustion Engine

First, a configuration example of the internal combustion engine will be described.

An internal combustion engine 100 illustrated in FIG. 1 is an in-cylinder injection type internal combustion engine (direct injection engine) that directly injects fuel made of gasoline into a cylinder. Note that the internal combustion engine 100 is not limited to the in-cylinder injection type, and a port injection type internal combustion engine that injects fuel to a suction port may be applied.

The internal combustion engine 100 is a four-cycle engine that repeats four strokes of a suction stroke, a compression stroke, a combustion (expansion) stroke, and an exhaust stroke. Further, the internal combustion engine 100 is, for example, a multi-cylinder engine including four cylinders (cylinders). Note that the number of cylinders included in the internal combustion engine 100 is not limited to four, and may include six or eight or more cylinders. The number of cycles of the internal combustion engine 100 is not limited to 4 cycles.

As illustrated in FIG. 1, the internal combustion engine 100 includes an air flow sensor 1, an electronically controlled throttle valve 2, an intake pressure sensor 3, a compressor 4*a*, an intercooler 7, and a cylinder 14. The air flow sensor 1, the electronically controlled throttle valve 2, the intake pressure sensor 3, the compressor 4*a*, and the intercooler 7 are disposed at positions up to the cylinder 14 in the intake pipe 6.

The air flow sensor 1 measures an intake air amount and an intake air temperature. The electronically controlled throttle valve 2 is driven so as to be openable and closable by a drive motor (not illustrated). Then, the opening degree of the electronically controlled throttle valve 2 is adjusted based on the driver's accelerator operation. Thus, the amount of air taken in is adjusted, and the pressure of the intake pipe 6 is adjusted. The intake pressure sensor 3 measures the pressure of the intake pipe 6.

The compressor 4*a* is a supercharger that supercharges intake air. The rotating force is transmitted to the compressor 4*a* by a turbine 4*b* to be described later. The intercooler 7 is disposed on the upstream side of the cylinder 14 and cools intake air.

In the internal combustion engine 100, a fuel injection device 13 that injects fuel into the cylinder 14, and an ignition device including an ignition coil 16 and an ignition plug 17 that supply ignition energy are provided for each cylinder 14. The ignition coil 16 generates a high voltage under the control of an internal combustion engine control device 20 and applies the high voltage to the ignition plug 17. As a result, sparks are generated in the ignition plug 17. Then, the air-fuel mixture in the cylinder burns and explodes by the sparks generated in the ignition plug 17.

A voltage sensor (not illustrated) is attached to the ignition coil 16. The voltage sensor measures a primary-side voltage or a secondary-side voltage of the ignition coil 16. Then, the voltage information measured by the voltage sensor is sent to the internal combustion engine control device 20 which is an engine control unit (ECU).

The cylinder head of the cylinder 14 is provided with a variable valve 5. The variable valve 5 adjusts the air-fuel mixture flowing into the cylinder 14 or the exhaust gas discharged from the cylinder. The intake air amount and the internal EGR amount of all the cylinders 14 are adjusted by adjusting the variable valve 5.

Further, a piston is slidably disposed in the cylinder 14. The piston compresses an air-fuel mixture of fuel and gas flowing into the cylinder 14. Then, the piston reciprocates in the cylinder 14 by the combustion pressure generated in the cylinder. A crank angle sensor 19 for detecting the position of the piston is attached.

The fuel injection device 13 injects fuel into the cylinder 14 under the control of an internal combustion engine control device (ECU) 20 described later. As a result, an air-fuel mixture in which fuel and air are mixed is generated in the cylinder 14. A high-pressure fuel pump (not illustrated) is connected to the fuel injection device 13. Fuel whose pressure is increased by the high-pressure fuel pump is supplied to the fuel injection device 13. Further, a fuel pressure sensor for measuring a fuel injection pressure is provided in a fuel pipe connecting the fuel injection device 13 and the high-pressure fuel pump.

The cylinder 14 is provided with a temperature sensor 18. The temperature sensor 18 measures the temperature of the coolant surrounding the cylinder 14. As a coolant device, there is a water pump (not shown), and the flow rate of the coolant surrounding the cylinder 14 is adjusted by the water pump. As a water pump, a water pump that is driven using the output of the internal combustion engine, a motorized water pump (electric water pump), or the like is applied. Although not illustrated, as a device for adjusting the coolant, in addition to the water pump, a thermostat for controlling the coolant flowing into the cylinder, and a valve for switching a flowing direction of the coolant provided in the internal combustion engine to each component such as a heat exchanger and a cylinder may be provided.

Further, each cylinder 14 of the internal combustion engine 100 is provided with an oil jet system 110. The oil jet system 110 is connected to an oil pump (not illustrated), and cooling oil is supplied from the oil pump. The oil jet system 110 injects cooling oil to the piston to lower the temperature of the piston. When the internal combustion engine control device 20 adjusts the output (Flow rate, hydraulic pressure) of the oil pump, the oil jet system 110 may include a valve or the like that switches between injection and non-injection of the oil jet toward the piston. The oil jet system, the oil pump, the valve, and the like are hereinafter also referred to as a lubricating oil device.

An exhaust pipe 15 is connected to an exhaust port of the cylinder 14. The exhaust pipe 15 is provided with the turbine 4*b*, an electronically controlled wastegate valve 11, a three-way catalyst 10, and an air-fuel ratio sensor 9. The turbine 4*b* is rotated by the exhaust gas passing through the exhaust pipe 15, and transmits the rotating force to the compressor 4*a*. The electronically controlled wastegate valve 11 adjusts an exhaust flow path flowing to the turbine 4*b*.

The three-way catalyst 10 purifies harmful substances contained in the exhaust gas by an oxidation/reduction reaction. The air-fuel ratio sensor 9 is disposed on the upstream side of the three-way catalyst 10. Then, the air-fuel ratio sensor 9 detects the air-fuel ratio of the exhaust gas passing through the exhaust pipe 15.

Signals detected by the respective sensors such as the air flow sensor 1, the intake pressure sensor 3, and the voltage sensor are sent to the internal combustion engine control device 20. In addition, a signal detected by an accelerator opening degree sensor 12 that detects the depression amount of an accelerator pedal, that is, the accelerator opening degree is also sent to the internal combustion engine control device 20.

The internal combustion engine control device 20 calculates a required torque based on the main signal of the accelerator opening degree sensor 12. That is, the accelerator opening degree sensor 12 is used as a required torque detection sensor that detects a required torque to the internal combustion engine 100. In addition, the internal combustion engine control device 20 calculates the rotational speed of the internal combustion engine 100 based on an output signal of a crank angle sensor (not illustrated). Then, the internal combustion engine control device 20 optimally calculates main operating amounts of the internal combustion engine 100 such as an air flow rate, a fuel injection amount, an ignition timing, and a fuel pressure based on an operation state of the internal combustion engine 100 obtained from outputs of various sensors.

The fuel injection amount calculated by the internal combustion engine control device 20 is converted into a valve opening pulse signal and output to the fuel injection device 13. In addition, the ignition timing calculated by the internal combustion engine control device 20 is output to the ignition plug 17 as an ignition signal. Further, a throttle opening degree calculated by the internal combustion engine control device 20 is output to the electronically controlled throttle valve 2 as a throttle drive signal.

The internal combustion engine 100 may be provided with an exhaust gas recirculation (EGR) pipe (not illustrated) that connects the intake pipe 6 and the exhaust pipe 15. A part of the exhaust gas passing through the exhaust pipe 15 may be returned to the intake pipe 6 by the EGR pipe.

1-2. Configuration Example of Internal Combustion Engine Control Device 20

Next, a configuration example of the internal combustion engine control device 20 will be described with reference to FIG. 2.

Figure 2:
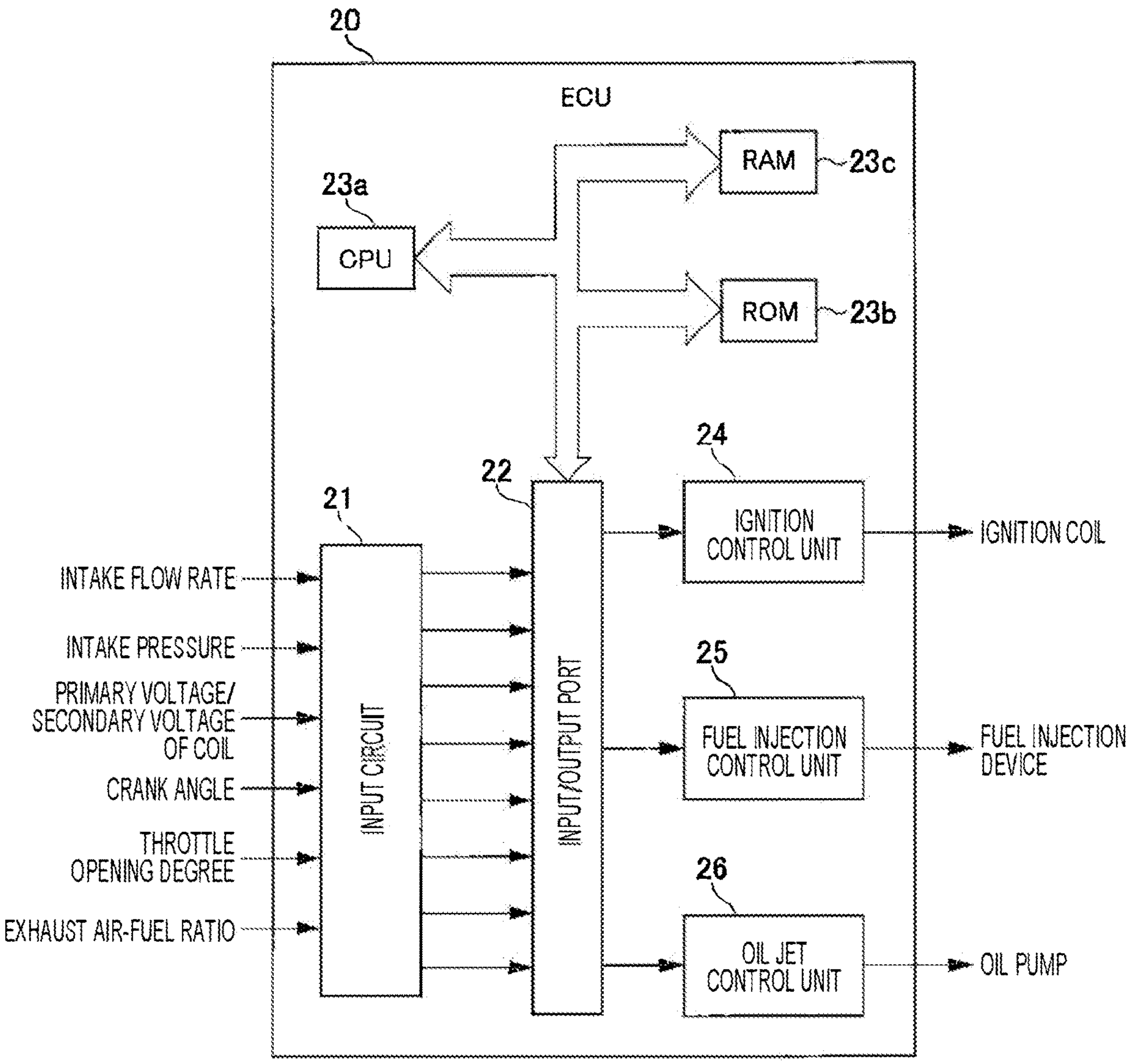
FIG. 2 is a block diagram illustrating a configuration of the internal combustion engine control device according to the first embodiment.

FIG. 2 is a block diagram illustrating a configuration of the internal combustion engine control device 20.

As illustrated in FIG. 2, the internal combustion engine control device 20 which is an engine control unit (ECU) includes an input circuit 21, an input/output port 22, a random access memory (RAM) 23*c*, a read only memory (ROM) 23*b*, and a central processing unit (CPU) 23*a*. The internal combustion engine control device 20 includes an ignition control unit 24, a fuel injection control unit 25, and an oil jet control unit 26.

The intake flow rate from the air flow sensor 1, the intake pressure from the intake pressure sensor 3, and the primary voltage or secondary voltage of the coil from the voltage sensor are input to the input circuit 21. Not only the intake flow rate, the intake pressure, the primary voltage, or the secondary voltage but also information measured by various sensors such as a crank angle, a throttle opening degree, and an exhaust air-fuel ratio are input to the input circuit 21.

The input circuit 21 performs signal processing such as noise removal on the input signal and sends the signal to the input/output port 22. The value input to the input port of the input/output port 22 is stored in the RAM 23*c*.

The ROM 23*b* stores a control program describing contents of various arithmetic processing executed by the CPU 23*a*, a MAP, a data table, and the like used for each processing. The RAM 23*c* is provided with a storage area for storing a value input to the input port of the input/output port 22 and a value representing the operation amount of each actuator calculated according to the control program. The value representing the operation amount of each actuator stored in the RAM 23*c* is sent to the output port of the input/output port 22.

The ignition signal set in the output port of the input/output port 22 is sent to the ignition coil 16 via the ignition control unit 24. The ignition control unit 24 controls the energization timing and the energization time of the ignition coil 16. Further, the ignition control unit 24 performs discharge energy control in the ignition plug 17.

The fuel injection control unit 25 controls a fuel injection device 13 that is a fuel injection device and a high-pressure fuel pump that supplies fuel to the fuel injection device 13. That is, the fuel injection control unit 25 controls the valve opening timing and the valve closing timing of the fuel injection device 13 and the valve for adjusting the pressure of the high-pressure fuel pump.

The oil jet control unit 26 controls an oil pump that supplies oil to the oil jet system 110. The oil jet control unit 26 controls the oil pump to control the amount of oil injected from the oil jet system 110.

In the present example, an example in which the ignition control unit 24, the fuel injection control unit 25, and the oil jet control unit 26 are provided in the internal combustion engine control device 20 has been described, but the present invention is not limited thereto. For example, a part of the ignition control unit 24, the fuel injection control unit 25, and the oil jet control unit 26, or all of the ignition control unit 24, the fuel injection control unit 25, and the oil jet control unit 26 may be mounted on a control device different from the internal combustion engine control device 20.

1-3. Control Outline of Internal Combustion Engine Control Device

Next, a control outline of the internal combustion engine control device 20 will be described with reference to FIG. 3.

Figure 3:
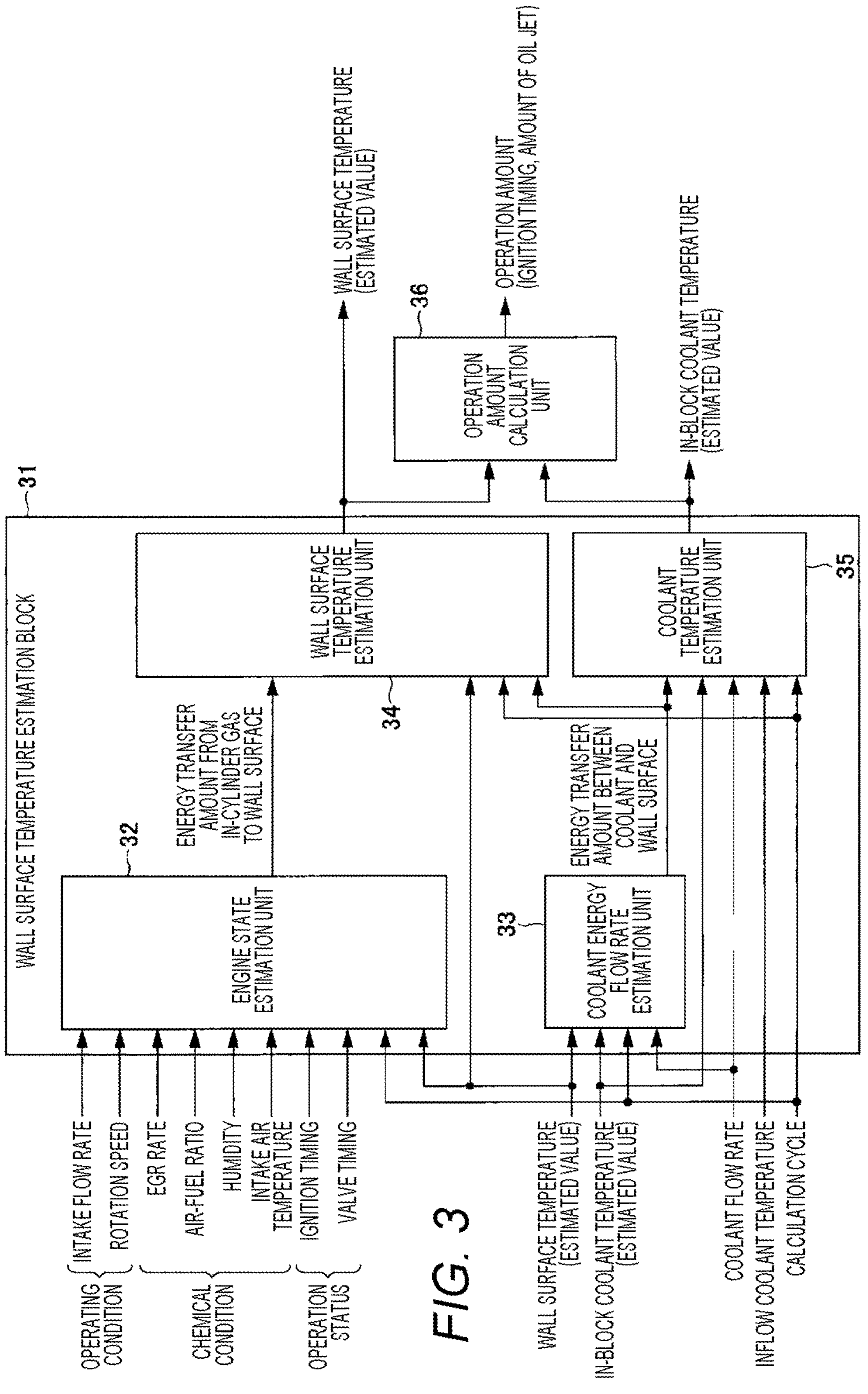
FIG. 3 is a control block diagram illustrating a control outline of the internal combustion engine control device according to the first embodiment.

FIG. 3 is a control block diagram illustrating a control outline executed by the internal combustion engine control device 20.

As illustrated in FIG. 3, the internal combustion engine control device 20 includes a wall surface temperature estimation block 31 and an operation amount calculation unit 36 that calculates operation amounts of various actuators. The wall surface temperature estimation block 31 includes an engine state estimation unit 32, a coolant energy flow rate estimation unit 33, a wall surface temperature estimation unit 34, and a coolant temperature estimation unit 35.

An operating condition, a chemical condition, and an operation status of the internal combustion engine 100 are input to the engine state estimation unit 32. Examples of the parameter related to the operating condition include an intake flow rate and the rotation speed of the internal combustion engine 100. The intake pressure may be applied instead of the intake flow rate.

The chemical conditions are indicative of the combustion conditions of the fuel in the cylinder 14. Examples of the parameter related to the chemical condition include an EGR rate, an air-fuel ratio, humidity, an intake air temperature, and the like. The parameter related to the chemical condition is not limited to the EGR rate, the air-fuel ratio, the humidity, and the intake air temperature, and for example, a type of fuel or the like may be used.

The operation status indicates operation amounts of various actuators. Examples of the parameter related to the operation status include ignition timing, valve timing indicating the operation amount of the variable valve 5, and the like. As the parameter related to the operation status, the fuel injection timing which is the operation amount of the fuel injection device 13 may be used.

The engine state estimation unit 32 receives an input of a wall surface temperature (estimated value) calculated by a wall surface temperature estimation unit 34 to be described later in a previous calculation cycle. The engine state estimation unit 32 calculates an energy transfer amount which is one of engine states based on the input various information. The energy transfer amount is a transfer amount of energy from combustion gas generated in the cylinder 14 to an engine wall surface (hereinafter, simply referred to as a "wall surface"). Then, the engine state estimation unit 32 outputs the calculated energy transfer amount from the in-cylinder gas to the wall surface to the wall surface temperature estimation unit 34.

When the engine state estimation unit 32 calculates the energy transfer amount, the estimation accuracy can be improved by using the wall surface temperature (estimated value).

To the coolant energy flow rate estimation unit 33, an in-block coolant temperature (estimated value) calculated by a coolant temperature estimation unit 35 to be described later in the previous calculation cycle and a wall surface temperature (estimated value) calculated by the wall surface temperature estimation unit 34 in the previous calculation cycle are input. The flow rate (coolant flow rate) of the coolant flowing into the engine block is input to the coolant energy flow rate estimation unit 33.

The coolant energy flow rate estimation unit 33 calculates an energy transfer amount between the coolant and the wall surface on the basis of the input various information. Then, the coolant energy flow rate estimation unit 33 outputs the calculated energy transfer amount between the coolant and the wall surface to the wall surface temperature estimation unit 34 and the coolant temperature estimation unit 35.

The energy transfer amount from the in-cylinder gas to the wall surface calculated by the engine state estimation unit 32 and the energy transfer amount between the coolant and the wall surface calculated by the coolant energy flow rate estimation unit 33 are input to the wall surface temperature estimation unit 34. The wall surface temperature (estimated value) calculated by the wall surface temperature estimation unit 34 in the previous calculation cycle is input to the wall surface temperature estimation unit 34.

Then, the wall surface temperature estimation unit 34 estimates the wall surface temperature on the basis of the input various types of information. The wall surface temperature estimation unit 34 outputs the estimated wall surface temperature to the operation amount calculation unit 36, the engine state estimation unit 32, and the coolant energy flow rate estimation unit 33.

The coolant temperature estimation unit 35 receives the temperature (inflow coolant temperature) of the coolant flowing into the engine block, which is the temperature of the coolant inlet, the coolant flow rate, and the energy transfer amount between the coolant and the wall surface calculated by the coolant energy flow rate estimation unit 33. The in-block coolant temperature (estimated value) calculated by the coolant temperature estimation unit 35 in the previous calculation cycle is input to the coolant temperature estimation unit 35 as the current coolant temperature.

Then, the coolant temperature estimation unit 35 estimates the temperature of the coolant in the engine block based on the input various information. The coolant temperature estimation unit 35 outputs the estimated temperature of the coolant to the operation amount calculation unit 36 and the coolant energy flow rate estimation unit 33.

The engine state estimation unit 32, the coolant energy flow rate estimation unit 33, the wall surface temperature estimation unit 34, and the coolant temperature estimation unit 35 each perform predetermined calculation for each preset calculation cycle. The calculation cycle is appropriately set according to each estimation unit.

The operation amount calculation unit 36 calculates and outputs operation amounts of various actuators such as an oil pump that supplies oil to the ignition plug 17, the fuel injection device 13, and the oil jet system 110 on the basis of the wall surface temperature estimated by the wall surface temperature estimation unit 34 and the temperature of the coolant estimated by the coolant temperature estimation unit 35.

1-4. Operation Example of Engine State Estimation Unit

Next, an operation example of calculating the energy transfer amount to the wall surface in the engine state estimation unit 32 will be described with reference to FIGS. 4 to 6.

Figure 4:
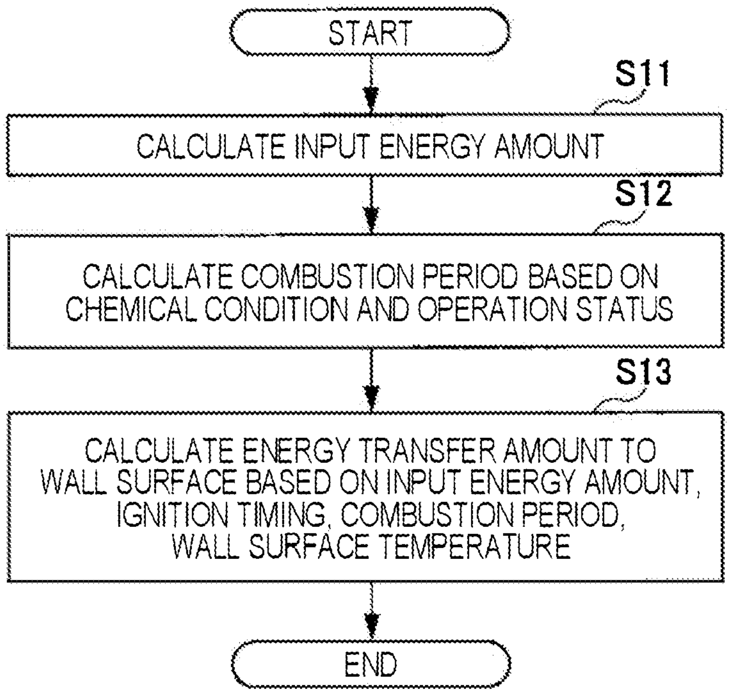
FIG. 4 is a flowchart illustrating an operation example of an engine state estimation unit of the internal combustion engine control device according to the first embodiment.

FIG. 4 is a flowchart illustrating an operation example of the engine state estimation unit 32.

First, as illustrated in FIG. 4, the engine state estimation unit 32 calculates an input energy amount Efuel input per cylinder in one combustion cycle based on the input operating condition and chemical condition (Step S11). In the processing of Step S11, the engine state estimation unit 32 calculates an air flow rate Mair (kg/s) from the following Expression 1. The air flow rate Mair is calculated from the intake flow rate and the EGR rate. An EGR rate Yegr is calculated from Expression 2 described later.

$$\mathrm{Efuel}=\mathrm{Mair}/(1+AFR)/(1-\mathrm{Yegr}))\times(120\div Ne)\times\mathrm{Hfuel}\div\mathrm{Ncyl} \quad \text{[Math. 1]}$$

Here, AFR is an air-fuel ratio, and a target air-fuel ratio or an exhaust air-fuel ratio calculated based on the air-fuel ratio sensor 9 or an O2 sensor provided in the exhaust pipe 15 may be used. Ne is the engine rotation speed (rotation/minute) and is calculated from the detection value of the crank angle sensor 19. Hfuel is a lower calorific value (J/kg) of the fuel and is a predetermined value. The lower calorific value (Hfuel) is, for example, a value of about 44.9×106 J/kg. Ncyl is the number of cylinders.

Next, the engine state estimation unit 32 calculates a combustion period in the cylinder 14 in one combustion cycle based on the chemical conditions and the operation status (Step S12). The combustion period can be calculated, for example, by selecting a dilution degree as a chemical condition and an ignition timing as an operating condition and using a map.

As the dilution degree, for example, an air-fuel ratio (AFR) can be applied under lean combustion conditions. When the exhaust gas is recirculated using the EGR pipe, the EGR rate can be used for the calculation. The EGR rate Yegr is calculated, for example, from the following Expression 2.

$$EGR\ \text{rate}=EGR\ \text{gas flow rate}/(EGR\ \text{gas flow rate}+Air\ \text{flow rate}) \quad \text{[Math. 2]}$$

Here, the EGR gas flow rate is estimated based on an opening degree of an EGR valve provided in the EGR pipe and configured to operate the EGR gas flow rate, or is calculated by detection of an EGR gas sensor provided in the EGR pipe.

Figure 5A:
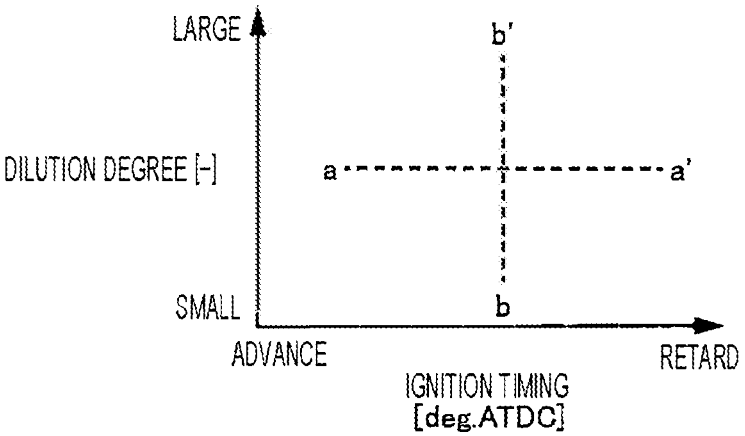
FIG. 5A illustrates a relationship between the dilution degree and the ignition timing.
Figure 5B:
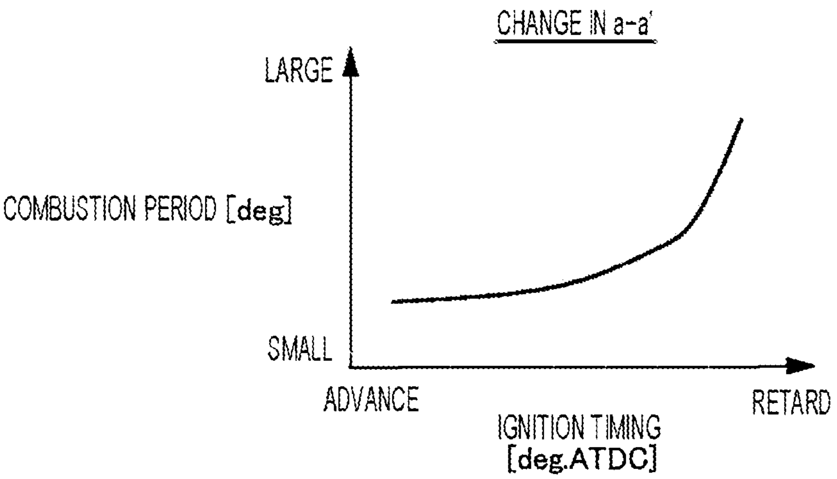
FIG. 5B illustrates a relationship between the dilution degree and the combustion period.
Figure 5C:
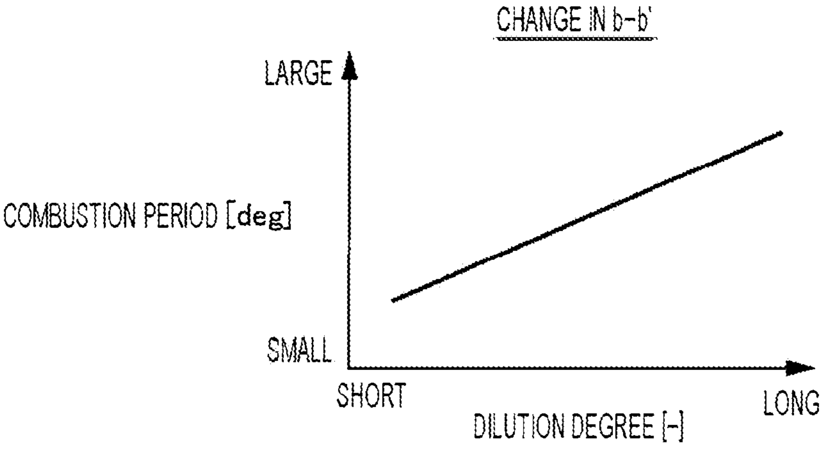
FIG. 5C is a map illustrating a relationship between the ignition timing and the combustion period.

FIGS. 5A to 5C show maps of a combustion period around a dilution degree and an ignition timing, in which FIG. 5A illustrates a relationship between the dilution degree and the ignition timing, FIG. 5B is a map illustrating a relationship between the combustion period and the ignition timing, and FIG. 5C is a map illustrating a relationship between the combustion period and the dilution degree. The maps illustrated in FIGS. 5A to 5C are stored in the engine state estimation unit 32.

As illustrated in FIG. 5B, when the ignition timing is retarded, the combustion period tends to increase. This is because when the ignition timing is delayed, the flame propagation proceeds in the expansion stroke, so that the time required for the flame to spread throughout increases. As illustrated in FIG. 5C, as the dilution degree increases, the combustion speed decreases, and thus the combustion period tends to increase. The engine state estimation unit 32 calculates the combustion period by using the maps illustrated in FIGS. 5A to 5C.

In the present example, the example of calculating the combustion period using the map has been described, but the present invention is not limited thereto. For example, a combustion period calculated from the output of the crank angle sensor 19 may be used instead of the preset value of the combustion period indicating an example of the combustion state.

As described above, by using the combustion period calculated from the detection value, the actual operation status can be reflected in the combustion period. As a result, it is possible to set the fuel period in consideration of individual variations and secular changes of the engine and variations of each cylinder. By setting the combustion period by the detection value, the value of the combustion period that affects the heat transfer amount to the wall surface can be brought close to the actual state, so that the estimation accuracy of the wall surface temperature can be improved.

Next, the engine state estimation unit 32 calculates an energy transfer amount from the in-cylinder gas to the wall surface on the basis of the input energy amount calculated in Step S11, the combustion period calculated in Step S12, the chemical conditions, the operating conditions, the operation status, and the wall surface temperature (estimated value) (Step S13). The wall surface temperature (estimated value) is a wall surface temperature calculated by the wall surface temperature estimation unit 34 in the previous calculation cycle. As a result, the operation of the engine state estimation unit 32 is completed.

In the present example, it is assumed that wall surface temperatures at a plurality of places are predicted, and the wall surface is divided into a plurality of regions and calculated. Examples of the region to be divided include a head, a piston, and a liner. Hereinafter, the divided region is referred to as a wall surface element, and is considered to be constituted by N wall surface elements per cylinder. Hereinafter, in the description of the N wall surface elements, an integer from 1 to N (N≤1) is assigned to each element. The contents applicable to all the wall surface elements will be described using i as a subscript.

In the present example, a head, a piston, and a liner are assumed as the wall surface element, but each component may be divided into a plurality of regions, and each divided portion may be used as the wall surface element.

In Step S13, the energy transfer amount Qcl_i(j) of the wall surface element i (i=1 to N) is calculated from the following Expression 3, for example.

$$Qcl\_i=\mathrm{Efuel}\times\eta\mathrm{wall}\times Ne\div120\times\Delta t\times A\_i\div\mathrm{Aall} \quad \text{[Math. 3]}$$

Here, i is a subscript (an integer from 1 to N (N≤1)), Qcl_i is an energy transfer amount (j/s) to the wall surface element i, ηwall is an energy transfer ratio to the wall surface, Δt is a calculation cycle (s), A_i is a surface area ($m^2$) of the wall surface element i, and Aall is a total surface area ($m^2$) of the engine. The total surface area Aall is the sum of i=1 to N of the surface area A_i of the wall surface element i.

Figure 6A:
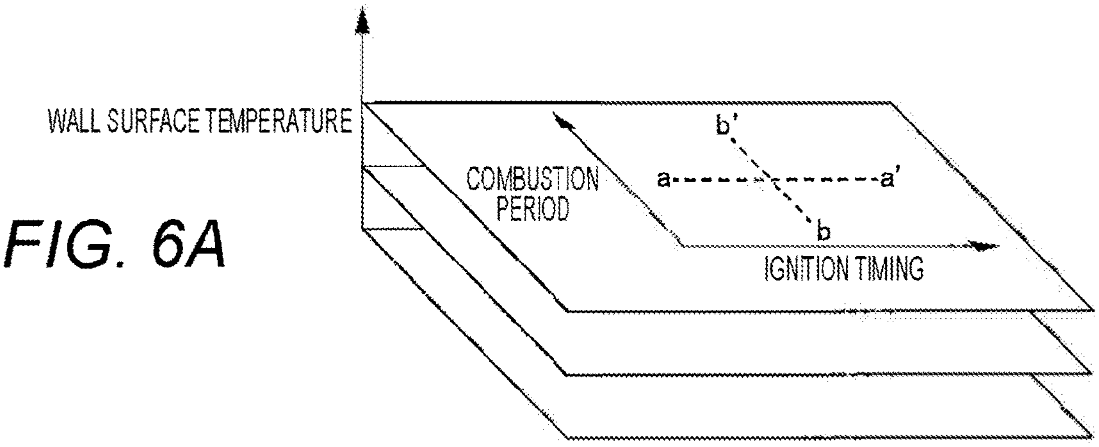
FIG. 6A illustrates a relationship between a combustion period, an ignition timing, and a wall surface temperature.
Figure 6B:
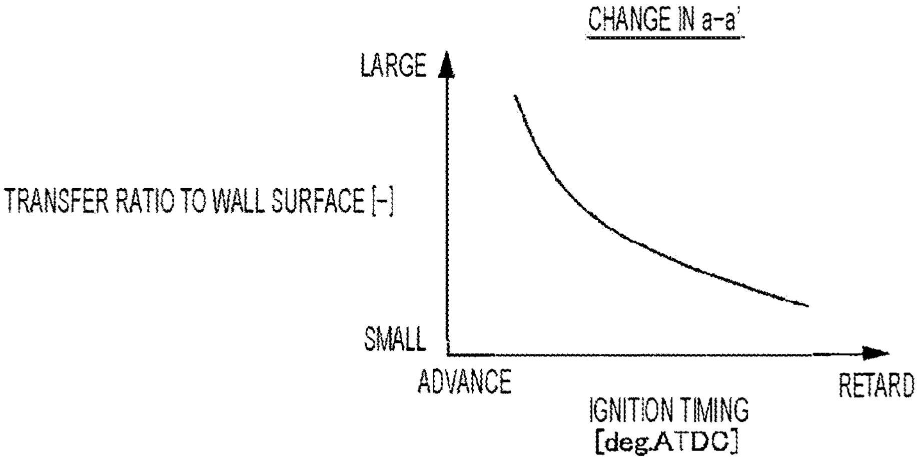
FIG. 6B illustrates a relationship between the ignition timing and an energy transfer ratio to the wall surface.
Figure 6C:
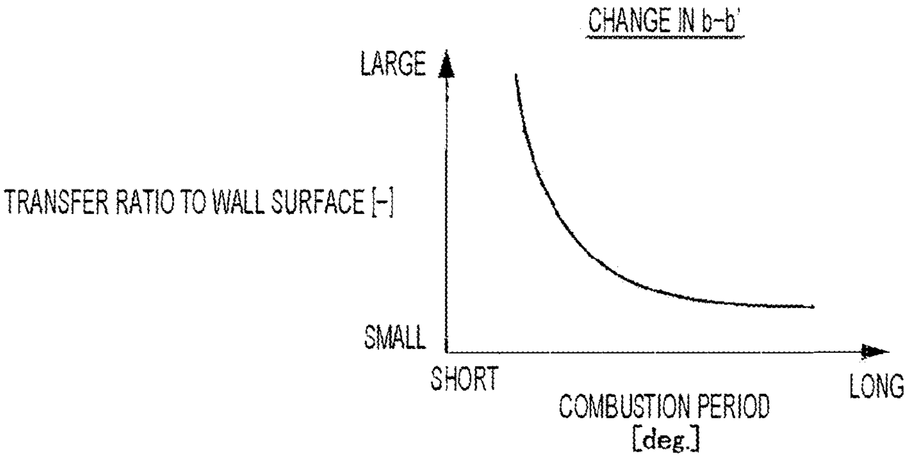
FIG. 6C is a map illustrating a relationship between the combustion period and the energy transfer ratio to the wall surface.

The energy transfer ratio ηwall to the wall surface changes depending on the wall surface temperature, the combustion period, and the ignition timing. FIGS. 6A to 6C are maps illustrating energy transfer ratios to the wall surface. FIG. 6A illustrates the relationship among the combustion period, the ignition timing, and the wall surface temperature, FIG. 6B illustrates the relationship between the ignition timing and the energy transfer ratio to the wall surface, and FIG. 6C is a map illustrating the relationship between the combustion period and the energy transfer ratio to the wall surface.

For example, the energy transfer ratio μwall to the wall surface can be calculated by using the maps of the wall surface temperature, the combustion period, and the ignition timing illustrated in FIGS. 6A to 6C. As illustrated in FIG. 6B, the energy transfer ratio ηwall to the wall surface tends to increase as the ignition timing is earlier. By starting combustion early, the combustion gas is compressed and the temperature of the combustion gas increases. As a result, the difference between the temperature of the combustion gas and the wall surface temperature increases, and the energy transfer ratio ηwall to the wall surface increases.

As illustrated in FIG. 6C, the energy transfer ratio ηwall to the wall surface tends to decrease as the combustion period increases. This is because an increase in the combustion period suppresses an increase in the temperature of the combustion gas and decreases the temperature of the combustion gas and the wall surface temperature. As a result, the energy transfer ratio ηwall to the wall surface decreases.

As described above, in the internal combustion engine control device 20 of the present example, the engine state estimation unit 32 first calculates the energy transfer amount to the wall surface when estimating the wall surface temperature. As a result, the energy transfer amount to the wall surface that changes depending on the parameter related to the operating condition of the internal combustion engine 100, the parameter related to the chemical condition of combustion, and the parameter related to the operation status of the internal combustion engine 100 can be reflected in the estimation of the wall surface temperature. As a result, since it is possible to estimate the temporal change of the wall surface temperature, it is possible to improve the estimation accuracy of the wall surface temperature in the process of changing the wall surface temperature of the internal combustion engine (engine block) 100 from a low condition to a high condition.

1-5. Operation Example of Coolant Energy Flow Rate Estimation Unit, Wall Surface Temperature Estimation Unit, and Coolant Temperature Estimation Unit Next, operation examples of the coolant energy flow rate estimation unit 33, the wall surface temperature estimation unit 34, and the coolant temperature estimation unit 35 described above will be described with reference to FIG. 7.

Figure 7:
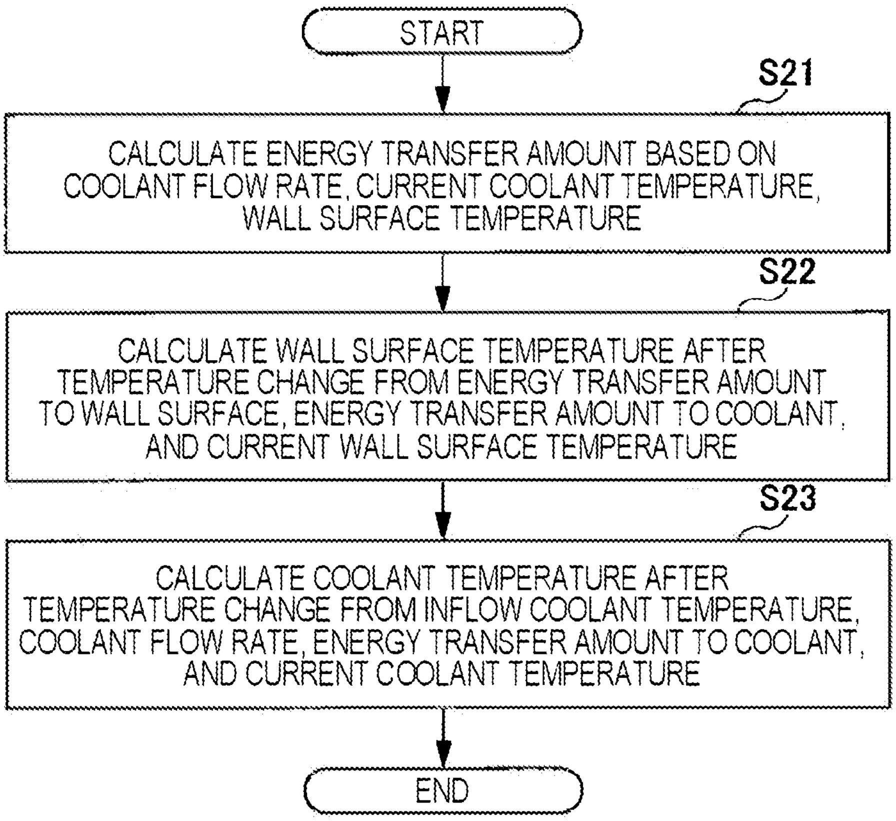
FIG. 7 is a flowchart illustrating an operation example of a coolant energy flow rate estimation unit, a wall surface temperature estimation unit, and a coolant temperature estimation unit of the internal combustion engine control device according to the first embodiment.

FIG. 7 is a flowchart illustrating an operation example of the coolant energy flow rate estimation unit 33, the wall surface temperature estimation unit 34, and the coolant temperature estimation unit 35.

First, as illustrated in FIG. 7, the coolant energy flow rate estimation unit 33 calculates the energy transfer amount to the coolant based on the coolant flow rate, the current coolant temperature, and the wall surface temperature (Step S21). The current coolant temperature is a coolant temperature (estimated value) calculated by the coolant temperature estimation unit 35 in the previous calculation cycle. The wall surface temperature is a wall surface temperature (estimated value) calculated by the wall surface temperature estimation unit 34 in the previous calculation cycle.

The energy transfer amount Qwtc(J) to the coolant is calculated from the following Expression 4.

$$Qwtc=\Sigma Qwtc\_i(i=1\sim N) \quad \text{[Math. 4]}$$

Here, Qwtc_i is an energy transfer amount from the wall surface portion of a prediction target to the coolant. Then, the energy transfer amount Qwtc_i(J) from the wall surface portion of the prediction target to the coolant is calculated from the following Expression 5.

$$Qwtc\_i=Awtc\_i\times hwtc\times(Tcb-Tw\_i)\times\Delta t \quad \text{[Math. 5]}$$

In Expression 5, Awtc_i represents the contact area ($m^2$) between the wall surface element i and the coolant, hwtc represents a heat transfer coefficient ($W/m^2/K$) between the coolant and the wall surface, Tcb represents the estimated value (K) of the in-block coolant temperature, and Tw_i represents the wall surface temperature (K) of the prediction target. Then, Δt is a calculation cycle (s). The estimated value Tcb of the in-block coolant temperature is the current coolant temperature.

Here, the setting of the calculation cycle Δt can be appropriately set according to the operation period of the actuator to be operated. For example, when it is desired to change the ignition timing and the injection timing for each cycle and reflect the state of the wall surface temperature with respect to the change, the calculation cycle Δt is set to a time corresponding to one combustion cycle. When the operation amount is changed according to a specific job period, the calculation cycle Δt is set to the job period. For example, in a case where the job period is 10 Hz, the calculation cycle Δt is set to 0.1 seconds. In this way, by appropriately setting the calculation cycle Δt, execution with an appropriate calculation load can be performed according to the phenomenon of the control target and the operation amount.

The heat transfer coefficients hwtc of the coolant and the wall surface depend on a parameter (for example, the flow velocity or the Reynolds number) related to the flow speed of the coolant and a parameter (for example, the temperature or the Prandtl number) related to the coolant temperature thermal conductivity. Therefore, the heat transfer coefficient hwtc between the coolant and the wall surface can be calculated from the following Expression 6.

$$hwtc=Ohwtc\times F(Tc)\times G(Mc\_i) \quad \text{[Math. 6]}$$

Chwtc in Expression 6 is a model constant, F(Tc) is a function that monotonically increases with respect to the coolant temperature in the block, and G(Mc_i) is a function that monotonically increases with respect to the coolant flow rate (kg/s) in the block. The function F(Tc) is calculated from the following Expression 7, and the function G(Mc_i) is calculated from the following Expression 8. Note that Af and Bf in Expression 7 are model constants and are identified by experiments and simulations. Expressions 7 and 8 are examples, and may be formulated in a form in which sensitivity with the coolant temperature and the flow rate can be expressed.

$$F(Tc)=Af\times Tc-Bf \quad \text{[Math. 7]}$$

$$G(Mc\_i)=Mc\_i)^{\wedge}1.3 \quad \text{[Math. 8]}$$

Next, the wall surface temperature estimation unit 34 calculates the wall surface temperature after the temperature change from the energy transfer amount to the wall surface calculated by the engine state estimation unit 32, the energy transfer amount to the coolant calculated by the coolant energy flow rate estimation unit 33 in the processing of Step S21, and the current wall surface temperature (Step S22). The current wall surface temperature is a wall surface temperature (estimated value) calculated by the wall surface temperature estimation unit 34 in the previous calculation cycle.

The wall surface temperature Tw_i (K) can be calculated from the following Expression 9, for example. The wall surface temperature Tw_i (K) is the wall surface temperature of the wall surface element i.

$$Tw\_i(n+1)=Tw\_i(n)+(Qcl\_i-\text{Qwtc\_}i)/Mw\_i/\text{Cwall} \quad \text{[Math. 9]}$$

Mw_i in Expression 9 is the mass (kg) of the wall surface of the wall surface element, i is a subscript and is an integer from 1 to N, and Cwall is the specific heat (J/kg/K) of the wall surface. Further, n indicates a current time, and n+1 indicates a time after a calculation cycle from the current time.

After the wall surface temperature is calculated, the coolant temperature estimation unit 35 estimates the coolant temperature in the block (Step S23). That is, the coolant temperature estimation unit 35 calculates the coolant temperature after the temperature change from the inflow coolant temperature, the coolant flow rate, the energy transfer amount to the coolant, and the current coolant temperature. The current coolant temperature is a coolant temperature (estimated value) calculated by the coolant temperature estimation unit 35 in the previous calculation cycle.

The coolant temperature Tc (n+1) (K) in the block after the temperature change can be calculated, for example, from the following Expression 10.

$$Tc(n+1)=Tc(n)+(\text{Qwtc}\times\text{Ncyl}+Mc\_\text{in}\times Cc\times(Tc\_\text{in}-Tc(n))\times\Delta t)\div(Mc\times Cc) \quad \text{[Math. 10]}$$

Cc in Expression 10 is the specific heat (J/kg/K) of the coolant, and Mc is the mass (kg) of the coolant.

As a result, the operations of the coolant energy flow rate estimation unit 33, the wall surface temperature estimation unit 34, and the coolant temperature estimation unit 35 are completed. Note that the calculation processing of the wall surface temperature in Step S22 and the calculation processing of the coolant temperature in Step S23 may be performed simultaneously, or the calculation processing of the coolant temperature in Step S23 may be executed first.

As described above, according to the internal combustion engine control device 20 of the present example, in estimating the wall surface temperature, the coolant energy flow rate estimation unit 33 calculates the energy transfer amount between the engine block and the coolant based on the wall surface temperature, the coolant flow rate, and the coolant temperature estimated last time. As a result, it is possible to estimate the temporal change of the wall surface temperature in consideration of the wall surface temperature, the flow rate of the coolant, the wall surface transfer efficiency depending on the temperature of the coolant, and the temporal change of the coolant temperature. As a result, it is possible to improve the estimation accuracy of the wall surface temperature under the condition that the wall surface temperature of the internal combustion engine (engine block) 100 is low.

1-6. Modification of Operation Example of Engine State Estimation Unit 32

Next, a modification of the calculation operation of the energy transfer amount to the wall surface in the engine state estimation unit 32 will be described with reference to FIG. 8.

Figure 8:
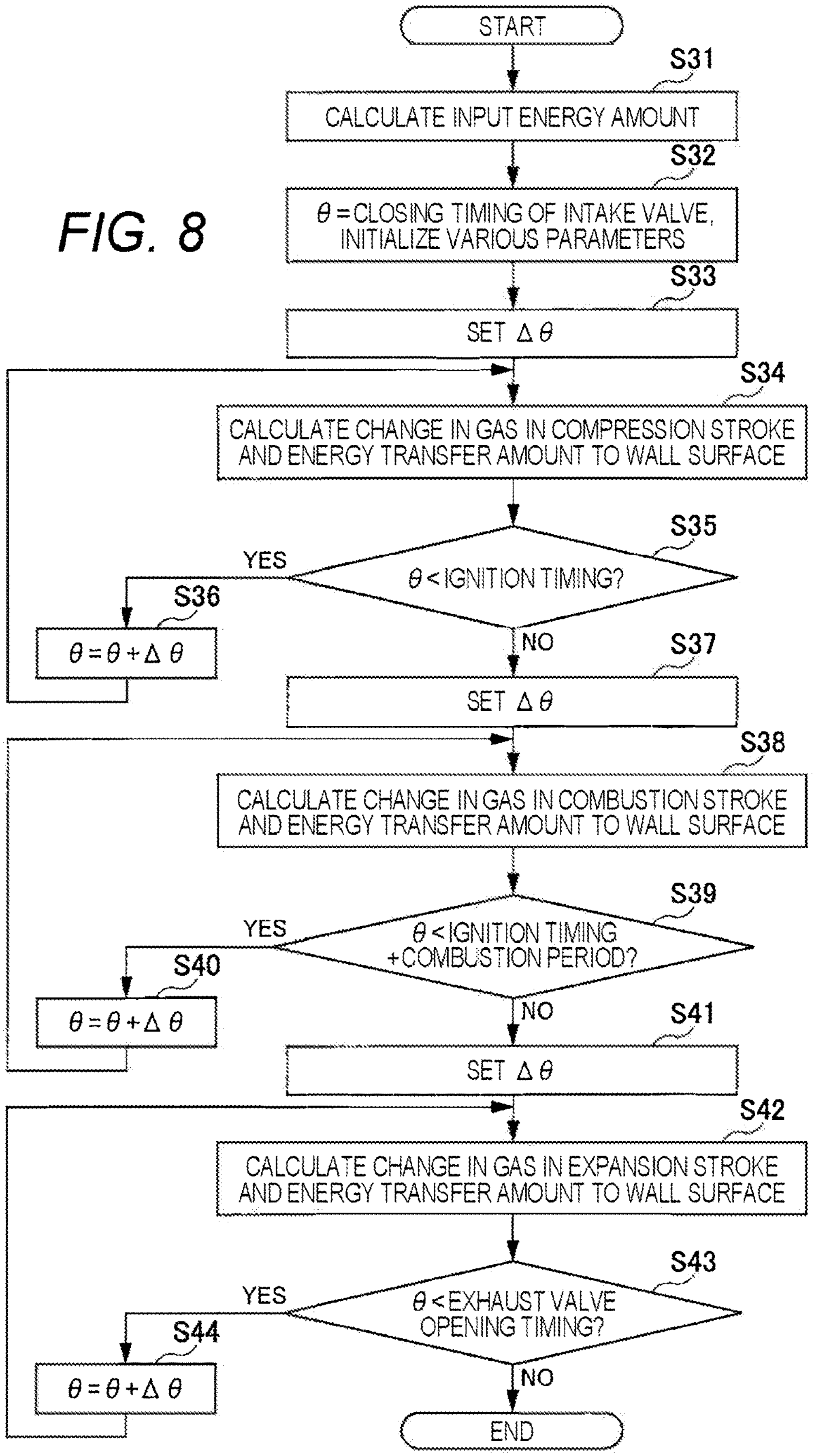
FIG. 8 is a flowchart illustrating a modification of the operation of the engine state estimation unit of the internal combustion engine control device according to the first embodiment.

FIG. 8 is a flowchart illustrating a modification of the operation of the engine state estimation unit 32.

In the processing of Step S13 in FIG. 4 described above, the energy transfer amount to the wall surface is calculated using the maps illustrated in FIGS. 6A to 6C. However, as various actuators that affect the wall surface temperature increase, the operation amount also increases. As a result, the number of maps increases according to the increased actuators, and the time and effort for creating the maps increase. However, the energy transfer amount to the wall surface can also be calculated by a mathematical model expressing combustion in the internal combustion engine 100. This makes it possible to suppress an increase in the number of maps.

First, examples of the model equations used as the mathematical model of the internal combustion engine 100 are shown in Expression 11, Expression 12, and Expression 13. Expressions 11, 12, and 13 shown below are equations derived from the energy conservation equation of the combustion gas in the cylinder 14 and the state equation of the ideal gas. Mathematical expressions different from the following Expressions 11, 12, and 13 may be used.

The mathematical model of the internal combustion engine 100 derived from the energy conservation equation and the state equation of the ideal gas includes Expression 11, Expression 12, and Expression 13 shown below in a discrete state.

$$E(\theta+\Delta\theta)=E(\theta)-(\gamma-1)\times E(\theta)\times\ln\{V(\theta+\Delta\theta)/V(\theta)\}-\text{dQcl}(\theta)+\text{dQHR}(\theta) \quad \text{[Math. 11]}$$

$$T(\theta+\Delta\theta)=(\gamma-1)\times E(\theta+\Delta\theta)/(M\times R) \quad \text{[Math. 12]}$$

$$p(\theta+\Delta\theta)=(\gamma-1)\times E(\theta+\Delta\theta)/V(\theta+\Delta\theta) \quad \text{[Math. 13]}$$

Here, θ is a crank angle (radian), Δθ is a width (time step) (radian) of a traveling time from a current point of time, E(θ) is internal energy (J) of gas in the cylinder 14 (in the cylinder), γ is a specific heat ratio, V(θ) is a volume (m3) in the cylinder, and dQcl(θ) is an energy transfer amount (J) to the wall surface between Δθ. In addition, dQHR(θ) is a calorific value (J) due to combustion between Δθ, T(θ) is a gas temperature (K), p(θ) is an in-cylinder pressure (Pa), M is an in-cylinder gas amount (kg), and R is a gas constant (J/kg/K).

The engine state estimation unit 32 calculates the internal energy E, the temperature T, and the pressure p at the crank angle θ+Δθ using Expression 11, Expression 12, and Expression 13 described above. The engine state estimation unit 32 repeats this calculation to calculate a change from the closing timing of the intake valve to the opening timing of the exhaust valve.

Here, assuming the time point of the crank angle θ, various values at the crank angle θ are known, but various values at the crank angle θ+Δθ are unknown. However, the in-cylinder volume V can be expressed by an equation or a map as a function of the crank angle θ. Therefore, the values of the in-cylinder volume V at the crank angle θ and the crank angle θ+Δθ are known. The in-cylinder volume V can be calculated, for example, from the following Expression 14.

$$V(\theta)V0+0.25\times\pi\times D\hat{}2\times Rc\times\{1-\cos(\theta)+[\lambda(1-(1-(\sin(\theta)/\lambda)\hat{}2)\hat{}0.5)\}\quad\text{[Math. 14]}$$

In Expression 14, V0 is the in-cylinder volume ($m^3$) when the piston is located at the top dead center, π is the circumference ratio, D is the bore diameter (m) of the piston, and Rc is the crank radius (half the piston stroke amount) (m). In addition, λ is a ratio of a connecting rod length and a crank radius (connecting rod length÷crank radius), and is a value determined by a mechanism of the internal combustion engine 100.

As a result, the engine state estimation unit 32 can obtain the internal energy E at the crank angle θ+Δθ and then obtain the temperature T and the pressure p at the crank angle θ+Δθ by using Expression 11 to Expression 14 described above. The energy transfer amount dQcl to the wall surface can be calculated from the following Expressions 15 and 16.

$$\mathrm{dQcl}(\theta)=\mathrm{dQcl\_1}(\theta)+\ldots+\mathrm{dQcl\_}N(\theta)\quad\text{[Math. 15]}$$

$$\mathrm{dQcl\_}i(\theta)=\alpha A\_i\times(T-Tw\_i)\times\Delta\theta\times60\div Ne\quad\text{[Math. 16]}$$

Qcl_i expressed in Expression 16 can be calculated by adding dQcl_i for one combustion cycle. Specifically, it is calculated from Expression 17.

$$Qcl\_i=Qci\_i+\mathrm{dQcl\_}i(\theta)\quad\text{[Math. 17]}$$

Here, dQcl_i is a heat transfer amount (W) to the wall surface element i between Δθ, and α is a wall surface heat transfer coefficient ($W/K/m^3$). The wall surface heat transfer coefficient α can be calculated by, for example, Eichelberg's equation shown in the following Expression 18.

$$\alpha=CEi\times(Ne\times Rc\div30)\hat{}(1/3)\times p(\theta)\hat{}0.3\times T(\theta)\hat{}0.3\quad\text{[Math. 18]}$$

Here, CEi is a model constant, and is adjusted so that the experimental result and the calculation result match. CEi is adjusted to a value of about 0.5, for example.

In this manner, changes in temperature and pressure with respect to the crank angle are reflected in calculating the energy transfer amount to each wall surface element. As a result, when the operating conditions, the chemical conditions, the operation status, and the operating conditions for various actuators are changed, the change can be reflected in the energy transfer amount according to the change.

Further, the calorific value dQHR due to combustion can be obtained using, for example, Wiebe functions shown in the following Expression 19, Expression 20, and Expression 21.

$$\mathrm{dQHR}(\theta)=\mathrm{Efuel}\times(fw(\theta+\Delta\theta)-fw(\theta))\quad\text{[Math. 19]}$$

$$fw(\theta)=1-\exp(-x(\theta))\quad\text{[Math. 20]}$$

$$x(\theta)=a\{(\theta-\theta ADV)/\delta\theta\mathrm{comb}\}\hat{}(b+1)\quad\text{[Math. 21]}$$

Here, Efuel is an input energy amount obtained by Expression 1, δθcomb is a combustion period (radian), θADV is an ignition timing (radian), and a and b are model constants.

Work Weng of the internal combustion engine 100 can be calculated from the following Expression 22 and Expression 23.

$$\mathrm{dWeng}(\theta)=-p\times\{V(\theta+\Delta\theta)-V(\theta)\}\quad\text{[Math. 22]}$$

$$\mathrm{Weng}=\mathrm{Weng}+\mathrm{dWeng}(\theta)\quad\text{[Math. 23]}$$

Next, a modification of the operation of the engine state estimation unit 32 using the mathematical model described above will be described with reference to FIG. 8. FIG. 8 is a flowchart illustrating a modification of the operation of the engine state estimation unit 32.

As illustrated in FIG. 8, the engine state estimation unit 32 calculates an input energy amount (Step S31). Since the processing of Step S31 is similar to the processing of Step S11 in FIG. 4, the description thereof will be omitted.

Next, the engine state estimation unit 32 sets the crank angle θ as the closing timing of the intake valve and initializes various parameters (Step S32). That is, in the processing of Step S32, the engine state estimation unit 32 also sets the values of the internal energy E, the temperature T, and the pressure p to values that assume the closing timing of the intake valve. For example, the temperature T is set to the same temperature as the temperature of the intake pipe 6, and the pressure p is set to the same pressure as the pressure of the intake pipe 6. Then, the internal energy E can be calculated by the following Expression 24 obtained by transforming the above-described Expression 12.

$$E(\theta)=M\times R\times T(\theta)/(\gamma-1)\quad\text{[Math. 24]}$$

In the processing of Step S32, the engine state estimation unit 32 sets the energy transfer amount Qcl_i to each wall surface element to 0.

Next, the engine state estimation unit 32 sets Δθ for calculating the energy transfer amount to the wall surface element in the compression stroke (Step S33). A can be obtained by, for example, the following Expression 25.

$$\Delta\theta=(\text{Ignition timing}-\text{Closing timing of intake valve})/\mathrm{Ncomp}\quad\text{[Math. 25]}$$

Ncomp is a parameter for adjusting the number of times of calculation from the closing timing of the intake valve to the ignition timing.

When Δθ in the compression stroke is set, the engine state estimation unit 32 calculates a change in gas in the compression stroke and an energy transfer amount to the wall surface (Step S34). In the processing of Step S34, the engine state estimation unit 32 performs calculation using the above-described Expression 11 to Expression 18, Expression 22, and Expression 23. In Expression 11, the calorific value dQHR due to combustion is set to 0 and calculated.

Next, the engine state estimation unit 32 determines whether the crank angle θ is smaller than the ignition timing, that is, whether the crank angle θ is on the advance side of the ignition timing (Step S35). When it is determined in the processing of Step S35 that the crank angle θ is smaller than the ignition timing (YES in Step S35), the engine state estimation unit 32 adds Δθ to the crank angle θ (Step S36) and returns to the processing of Step S34. Here, Δθ to be added is Δθ calculated in Step S33.

On the other hand, in the processing of Step S35, when it is determined that the crank angle θ is larger than the ignition timing (NO in Step S35), the engine state estimation unit 32 sets Δθ for calculating the energy transfer amount to the wall surface element in the combustion stroke (Step S37). Δθ can be obtained by, for example, the following Expression 26.

$$\Delta\theta=\Delta\theta\mathrm{comb}/\mathrm{Ncomb}\quad\text{[Math. 26]}$$

Ncomb is a parameter for adjusting how many times the combustion period is calculated.

When Δθ in the combustion stroke is set, the engine state estimation unit 32 calculates a change in the combustion gas in the combustion stroke and the energy transfer amount to the wall surface (Step S38). In the processing of Step S38, the engine state estimation unit 32 performs calculation by using Expression 11 to Expression 23 described above.

Next, the engine state estimation unit 32 determines whether the crank angle θ is smaller than the sum of the ignition timing and the combustion period, that is, whether the crank angle θ is on the advance side of the combustion end timing (Step S39). In the processing of Step S39, when it is determined that the crank angle θ is smaller than the sum of the ignition timing and the combustion period (YES in Step S39), the engine state estimation unit 32 adds Δθ to the crank angle θ (Step S40), and returns to the processing of Step S38. Here, Δθ to be added is Δθ calculated in Step S37.

On the other hand, in the processing of Step S39, when it is determined that the crank angle θ is larger than the sum of the ignition timing and the combustion period (NO in Step S39), the engine state estimation unit 32 sets Δθ for calculating the energy transfer amount to the wall surface element in the expansion stroke (Step S41). Δθ can be obtained by, for example, the following Expression 27.

$$\Delta\theta=\{\text{Opening timing of exhaust valve}-(\text{Ignition timing}+\text{Combustion period})\}/\text{Nexpa} \quad \text{[Math. 27]}$$

Nexpa is a parameter for adjusting how many times the calculation is performed from the combustion end timing to the opening timing of the exhaust valve.

When Δθ in the expansion stroke is set, the engine state estimation unit 32 calculates a change in gas in the expansion stroke and the energy transfer amount to the wall surface (Step S42). In the processing of Step S42, the engine state estimation unit 32 performs calculation using the above-described Expression 11 to Expression 18, Expression 22, and Expression 23. In Expression 11, the calorific value dQHR due to combustion is set to 0 and calculated.

Next, the engine state estimation unit 32 determines whether the crank angle θ is smaller than the opening timing of the exhaust valve, that is, whether the crank angle θ is on the advance side of the opening timing of the exhaust valve (Step S43). When it is determined in the processing of Step S43 that the crank angle θ is smaller than the opening timing of the exhaust valve (YES in Step S43), the engine state estimation unit 32 adds Δθ to the crank angle θ (Step S44) and returns to the processing of Step S42. Here, Δθ to be added is Δθ calculated in Step S41.

On the other hand, in the processing of Step S43, when it is determined that the crank angle θ is larger than the opening timing of the exhaust valve (NO in Step S43), the engine state estimation unit 32 ends the operation.

As described above, in the operation example illustrated in FIG. 8, the combustion state in the cylinder 14 is predicted using the mathematical model of the internal combustion engine 100, and the energy transfer amount to the wall surface is calculated. As a result, it is possible to calculate the energy transfer amount to the wall surface in consideration of the combustion state that changes depending on various parameters. As a result, the energy transfer amount to the wall surface can be calculated without preparing a map for calculating the energy transfer amount to the wall surface in advance. Even in a case where the operating condition and the operation status of the internal combustion engine 100 deviate from the operating condition and the operation status assumed in the map, the estimation accuracy of the wall surface temperature can be improved, and the model adaptation time can be shortened.

The energy (exhaust energy) Qex flowing from the energy transfer amount Qcl, the work Weng of the internal combustion engine 100, and the input energy amount Efuel calculated in the operation example illustrated in FIG. 8 to the exhaust can be calculated. The exhaust energy Qex is calculated from the following Expression 28, for example.

$$Qex=\text{Efuel}-Qcl-\text{Weng} \quad \text{[Math. 28]}$$

As a result, the exhaust energy Qex can also be calculated after predicting the combustion state in the internal combustion engine 100. As a result, a sensor for detecting the exhaust energy Qex becomes unnecessary, and the number of components can be reduced.

Further, the temperature of the coolant has a distribution of an entrance temperature flowing into the engine block and an exit temperature discharged from the engine block. Assuming that the wall surface temperature of the reference cylinder 14 among the plurality of cylinders 14 is estimated with the above-described configuration, the calculation load increases in order to individually estimate the wall surface temperature of the plurality of cylinders 14.

In order to reduce the calculation load, for example, the entrance temperature and the exit temperature of the coolant may be detected, and the estimated value may be corrected based on these pieces of information. For example, it is assumed that the coolant flows from the first cylinder 14 arranged closest to the entrance of the coolant among the plurality of cylinders 14 to the fourth cylinder 14 arranged closest to the exit of the coolant. When the water temperature of the third cylinder 14 is estimated, the wall surface temperature of each cylinder 14 can be estimated using the following Expression 29.

$$Tw\_i\_j=Tw\_i\times\{1+C\times(Tc\_\text{out}-Tc\_\text{in})/4\times(j-3)\} \quad \text{[Math. 29]}$$

j in Expression 29 is the number of the cylinder 14, and is set to, for example, 1, 2, 3, and 4 in the case of a four-cylinder engine. C is a constant for matching the estimated value of the wall surface temperature of each cylinder 14, and is set to, for example, a value less than 1. As a result, the wall surface temperature of each cylinder 14 can be estimated by estimating the wall surface temperature of one cylinder 14 among the plurality of cylinders 14 without estimating the wall surface temperature of the internal combustion engine 100 for multiple cylinders. As a result, the load for calculating the wall surface temperatures of the plurality of cylinders 14 can be reduced.

1-7. Operation Example of Operation Amount Calculation Unit

Next, an operation example of the operation amount calculation unit 36 will be described.

Based on the wall surface temperature calculated by the wall surface temperature estimation unit 34 and the in-block coolant temperature calculated by the coolant temperature estimation unit 35, the operation amount calculation unit 36 calculates and outputs operation amounts of various actuators that operate distribution of combustion energy.

Here, operating the distribution of the combustion energy means operating a distribution rate to an output to which the input energy is distributed, a heat transfer amount to a wall surface, an amount discharged as an exhaust gas, and the like. For example, in the case of a gasoline engine, the distribution rate is operated by the ignition timing, the fuel injection timing, the piston cooling amount by the oil jet, and the flow rate of the coolant amount and the temperature. Examples of the various actuators that the operation amount calculation unit 36 of the present example calculates and outputs the operation amount include, as an ignition device, a lubricating oil device such as the ignition plug 17, the ignition coil 16, the fuel injection device 13, and the oil jet system 110, and a coolant device such as a water pump.

The operation amount of the ignition device is the energization timing and the energization time of the ignition coil 16. The operation amount of the fuel injection device 13 is a valve opening timing or a valve closing timing of the fuel injection device 13, or an opening/closing operation of a valve for adjusting the pressure provided in the high-pressure fuel pump. The operation amount of the oil jet system 110 is the output of the oil pump, and the operation amount of the cooling device is the flow rate of the coolant and the temperature of the coolant entering the engine block.

As described above, the wall surface temperature estimation block 31 estimates the temporal change of the wall surface temperature in consideration of the operation status of the internal combustion engine 100 that changes depending on the operating condition, the combustion chemical condition, and the operation status. As a result, the operation amount calculation unit 36 can efficiently set the distribution amount of the energy input for combustion according to the estimated wall surface temperature.

Next, calculation and output operation examples of operation amounts of various actuators in the operation amount calculation unit 36 will be described with reference to FIG. 9.

Figure 9:
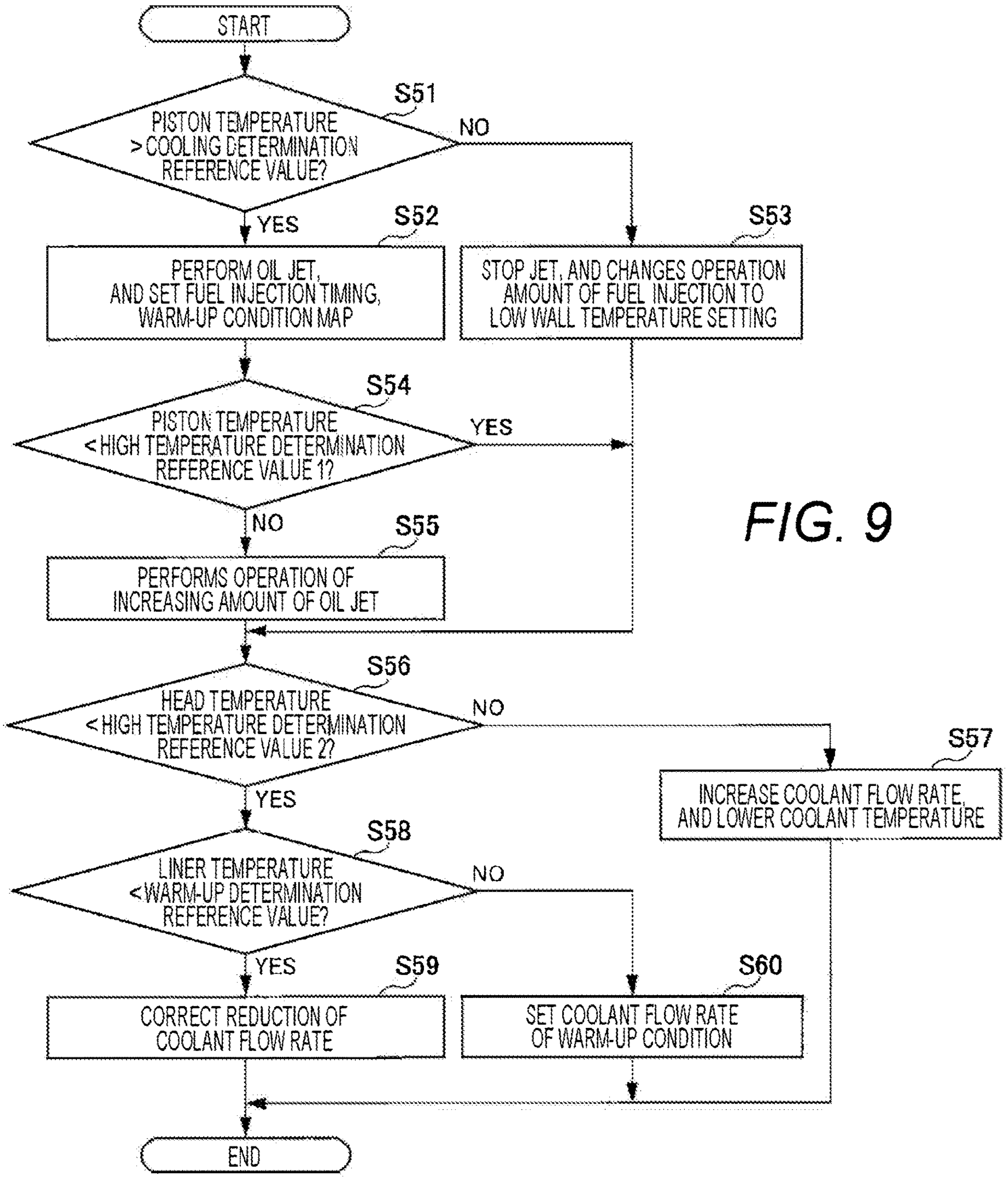
FIG. 9 is a flowchart illustrating an operation example of the operation amount calculation unit of the internal combustion engine control device according to the first embodiment.

FIG. 9 is a flowchart illustrating an operation example of the operation amount calculation unit 36. In the following example, as described above, an example in which the wall surface element is divided into a piston, a head, and a liner will be described. The wall surface temperature is estimated by the wall surface temperature estimation block 31 described above, and may be an average temperature of each element or a specific place of each element may be assumed. The wall surface element is not limited to the piston, the head, and the liner, and may include wall surface elements of various other places such as a valve.

As illustrated in FIG. 9, first, the operation amount calculation unit 36 determines whether the piston temperature is higher than a preset cooling determination reference value (Step S51). The cooling determination reference value is a reference value for determining whether to cool the piston in the oil jet system 110, and is set in advance by an experiment or the like. As the cooling determination reference value, for example, a piston temperature when the internal combustion engine 100 is operated in a specific operating condition under a condition of reaching a warm-up condition and reaches a steady state is used.

If it is determined in the processing of Step S51 that the piston temperature is higher than the cooling determination value (YES in Step S51), the operation amount calculation unit 36 causes the oil jet system 110 to jet oil (Step S52). In the processing of Step S52, the operation amount calculation unit 36 sets not only the operation amount of the oil jet system 110 but also the operation amount of the fuel injection.

In the processing of Step S52, the operation amount calculation unit 36 determines that the piston is in a state similar to the warm-up state. Therefore, the operation amount calculation unit 36 uses a set value in which the operation amount of the oil jet system 110 and the injection timing and the fuel pressure, which are the operation amount of the fuel injection, are adapted in the warm-up condition map. Specifically, when there is a valve that controls the presence or absence of the oil jet toward the piston, the oil jet system 110 is operated so that the oil is injected toward the piston by opening the valve. Alternatively, the pressure of the oil is increased to a predetermined value so that the amount of oil injected toward the piston reaches an adapted value.

When the processing of Step S52 ends, the operation amount calculation unit 36 proceeds to the processing of Step S54 described later.

On the other hand, when determining that the piston temperature is lower than the cooling determination reference value in the processing of Step S51 (NO in Step S51), the operation amount calculation unit 36 determines that the piston is in the cooling condition, and proceeds to the processing of Step S53. In the processing of Step S53, the operation amount calculation unit 36 causes the oil jet system 110 to stop the oil jet, and changes the injection amount and the injection timing, which are the operation amounts of the fuel injection, to the set values of the low wall temperature setting. The set value by the low wall temperature setting is a value different from the value adapted in the warm-up condition.

Specifically, when there is a valve that controls the presence or absence of the oil jet toward the piston, the valve is closed to stop the injection of the oil toward the piston. Alternatively, the amount of oil injected toward the piston is reduced by setting the pressure of the oil to a pressure lower than the adapted value of the warm-up condition. As a result, the amount of energy flowing from the piston to the oil can be reduced, and a decrease in the piston temperature can be suppressed.

The injection timing, which is the operation amount of the fuel injection, is set to be earlier than the value set in the warm-up condition map. Alternatively, the injection pressure, which is the operation amount of the fuel injection, is set to be larger than the value set in the warm-up condition map. As a result, the fuel adhering to the piston can be suppressed, the amount of energy flowing from the piston to the fuel can be reduced, and the decrease in the piston temperature can be suppressed.

When the processing of Step S53 ends, the operation amount calculation unit 36 proceeds to the processing of Step S56 described later.

In the processing of Step S54, the operation amount calculation unit 36 determines whether the piston temperature is lower than a high temperature determination reference value 1. The high temperature determination reference value 1 is a reference value for determining whether the piston temperature is high and reaches a temperature that causes an abnormality of the internal combustion engine 100 such as abnormal combustion. The high temperature determination reference value 1 is set to a value larger than the cooling determination reference value. Similarly to the cooling determination reference value, the high temperature determination reference value 1 is set in advance by an experiment or the like. The high temperature determination reference value 1 is preferably set particularly under a condition where the output of the internal combustion engine 100 is large such that abnormal combustion occurs.

When it is determined in the processing of Step S54 that the piston temperature is lower than the high temperature determination reference value 1 (YES in Step S54), the operation amount calculation unit 36 proceeds to the processing of Step S56 described later.

On the other hand, when it is determined in the processing of Step S54 that the piston temperature is higher than the high temperature determination reference value 1 (NO in Step S54), the operation amount calculation unit 36 determines that the piston temperature is high and there is a possibility of abnormal combustion. Then, the operation amount calculation unit 36 performs an operation of increasing the amount of the oil jet in order to increase the energy transfer amount from the piston to the oil (Step S55).

Specifically, the pressure of the oil is set to a value larger than the set value that is set in the processing of Step S52 and conforms to the warm-up condition map, and the amount of oil injected toward the piston is set to increase. As a result, the energy transfer amount from the piston to the oil can be increased, and the piston temperature can be lowered. When the processing of Step S55 ends, the operation amount calculation unit 36 proceeds to the processing of Step S56.

In the processing of Step S56, the operation amount calculation unit 36 determines whether the head temperature is lower than a high temperature determination reference value 2. The high temperature determination reference value 2 is a reference value for determining whether the head temperature is high and reaches a temperature that causes an abnormality of the internal combustion engine 100 such as abnormal combustion. Similarly to the cooling determination reference value and the high temperature determination reference value 1, the high temperature determination reference value 2 is set in advance by an experiment or the like. The high temperature determination reference value 2 is preferably set particularly under a condition where the output of the internal combustion engine 100 is large such that abnormal combustion occurs.

In the processing of Step S56, when it is determined that the head temperature is lower than the high temperature determination reference value 2 (YES in Step S56), the operation amount calculation unit 36 proceeds to the processing of Step S58 described later. On the other hand, when it is determined that the head temperature is higher than the high temperature determination reference value 2 in the processing of Step S56 (NO in Step S56), the operation amount calculation unit 36 determines that the head temperature is high and there is a possibility of leading to abnormal combustion.

Then, in order to increase the energy transfer amount from the head to the coolant, the operation amount calculation unit 36 performs an operation of increasing the coolant flow rate and lowering the coolant temperature (Step S57). Specifically, the number of rotations of a pump provided to circulate the coolant is increased, or the coolant amount at the exit of the radiator is decreased by increasing the coolant flow rate flowing to the radiator that exchanges energy between the external air and the coolant. As a result, the energy transfer amount from the wall surface to the coolant can be increased, and the head temperature can be lowered.

When the processing of Step S57 ends, the operation of the operation amount calculation unit 36 in one cycle is completed.

In the processing of Step S58, the operation amount calculation unit 36 determines whether the liner temperature is lower than a warm-up determination reference value. The warm-up determination reference value is a reference value for determining whether the liner temperature reaches the warm-up state. The warm-up determination reference value is also set in advance by an experiment or the like, similarly to the cooling determination reference value, the high temperature determination reference value 1, and the high temperature determination reference value 2. As the warm-up determination reference value, for example, the liner temperature when the internal combustion engine 100 is operated in a specific operating condition under a condition of reaching a warm-up condition and reaches a steady state is used.

When it is determined that the liner temperature is lower than the warm-up determination reference value in the processing of Step S58 (YES in Step S58), the operation amount calculation unit 36 determines that the liner temperature is in the cooling state. Then, the operation amount calculation unit 36 performs an operation of reducing the coolant flow rate flowing through the engine block in order to reduce the energy transfer amount from the engine block to the coolant (Step S59). For example, the rotation speed of a pump for circulating the coolant is reduced, or a valve for adjusting the coolant flowing to the engine block is closed. As a result, the coolant flow rate flowing to the engine block can be reduced.

On the other hand, when it is determined that the liner temperature is higher than the warm-up determination reference value in the processing of Step S58 (NO in Step S58), the operation amount calculation unit 36 determines that the internal combustion engine 100 is warmed up to an appropriate temperature. Therefore, the operation amount calculation unit 36 sets the coolant flow rate so as to set the coolant flow rate and the temperature suitable for the warm-up condition (Step S60). For example, the coolant flow rate flowing to a pump or a radiator for adjusting the coolant flow rate is adjusted.

As a result, the operation of the operation amount calculation unit 36 in one cycle is completed.

Figure 10:
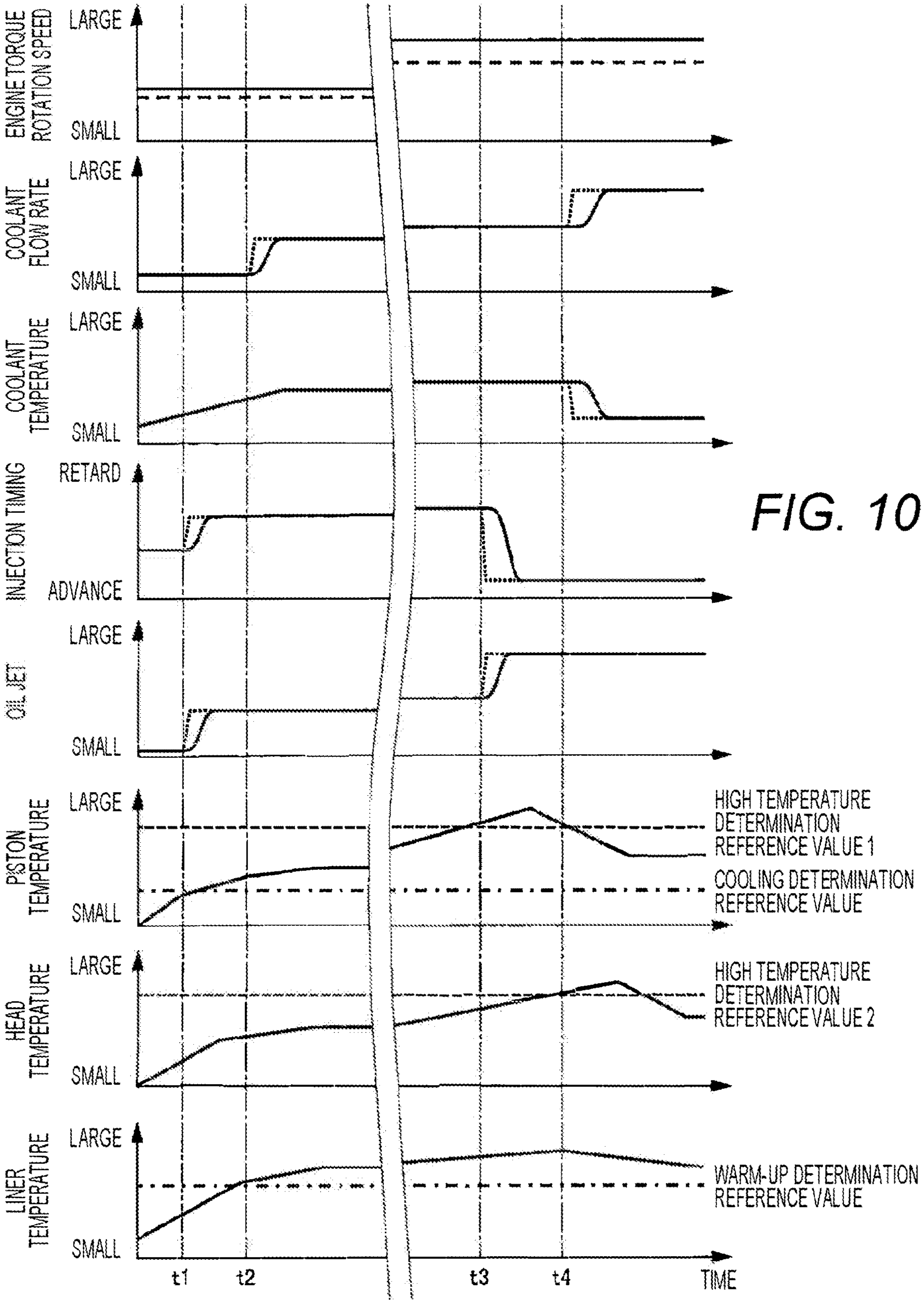
FIG. 10 is a timing chart illustrating an operation example of various actuators based on the operation example of the operation amount calculation unit illustrated in FIG. 9.

FIG. 10 is a timing chart illustrating an operation example of various actuators based on the operation example of the operation amount calculation unit 36 illustrated in FIG. 9 described above.

Time t1 in FIG. 10 indicates time when the piston temperature reaches the cooling determination reference value, and time t2 indicates time when the liner temperature reaches the warm-up determination reference value. Time t3 indicates time when the piston temperature reaches the high temperature determination reference value 1, and time t4 indicates time when the head temperature reaches the high temperature determination reference value 2.

As illustrated in FIG. 10, when the piston temperature reaches the cooling determination reference value at time t1, the amount of the oil jet is changed to a state in which the amount of the oil jet is reduced from the warm-up condition or the amount of the oil jet under the warm-up condition. Note that a dotted line in FIG. 10 indicates a target value, and a solid line indicates an actual response. As the piston temperature rises, the amount of the oil jet changes in an increasing direction.

The fuel injection timing is changed from the low wall temperature setting to the set value of the warm-up condition. In the cooling condition, from the viewpoint of securing a time for vaporizing the fuel, the fuel injection timing may be advanced as compared with the warm-up condition. As a result, the piston temperature can be gradually increased.

When the liner temperature reaches the warm-up determination reference value at time t2, the operation amount calculation unit 36 determines that the liner temperature has reached a sufficient value. Therefore, the coolant flow rate increases, and the rise in the liner temperature becomes gentle.

When the piston temperature reaches the high temperature determination reference value 1 at time t3, the operation amount calculation unit 36 determines that the occurrence probability of abnormal combustion has increased. Therefore, the amount of the oil jet is increased in order to lower the piston temperature. Further, when heat absorption from the piston by the fuel attached to the piston is effective, the combustion injection timing is advanced to increase the adhesion amount of fuel to the piston. This makes it possible to take energy from the piston when the fuel attached to the piston is vaporized. As a result, as illustrated in FIG. 10, the piston temperature can be lowered from the high temperature determination reference value 1.

Further, when the head temperature reaches the high temperature determination reference value 2 at time t4, the operation amount calculation unit 36 operates various related actuators so as to increase the coolant flow rate and decrease the coolant temperature. As the coolant flow rate flowing to the engine block increases and the coolant temperature lowers, the amount of heat taken by the coolant from the engine block can be increased. As a result, as illustrated in FIG. 10, the head temperature can be lowered from the high temperature determination reference value 2.

As described above, according to the internal combustion engine control device 20 of the present example, since the wall surface temperatures of the plurality of wall surface elements can be estimated in the wall surface temperature estimation block 31, the wall surface temperature for each element can be estimated in the internal combustion engine 100. As a result, the operation amounts of the various actuators can be appropriately calculated and output by the operation amount calculation unit 36 on the basis of the wall surface temperatures of the plurality of wall surface elements. As a result, it is possible to operate the energy distribution amount flowing to the oil, the coolant, and the fuel of the wall surface and the oil jet system 110 according to the wall surface temperature of each wall surface element.

2. Second Embodiment

Next, an internal combustion engine control device according to a second embodiment will be described with reference to FIGS. 11 to 15.

Figure 11:
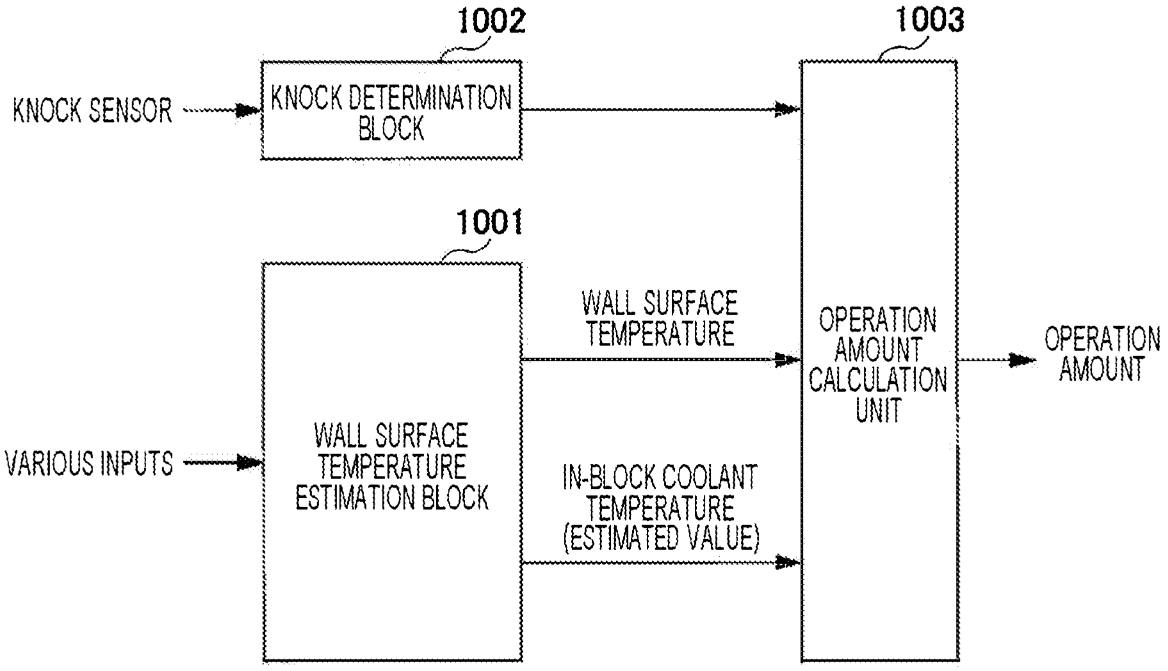
FIG. 11 is a control block diagram illustrating a control outline executed by an internal combustion engine control device according to a second embodiment.

FIG. 11 is a control block diagram illustrating a control outline executed by the internal combustion engine control device according to the second embodiment.

As illustrated in FIG. 11, the internal combustion engine control device according to the second embodiment includes a wall surface temperature estimation block 1001, a knock determination block 1002, and an operation amount calculation unit 1003. Since the wall surface temperature estimation block 1001 has the same configuration as the wall surface temperature estimation block 31 according to the first embodiment, the description thereof will be omitted.

The knock determination block 1002 receives a signal from a knock sensor provided in the internal combustion engine 100. Then, the knock determination block 1002 outputs the presence or absence of occurrence of knock (knock determination result) based on the signal received from the knock sensor. The knock determination block 1002 outputs a knock determination result to the operation amount calculation unit 1003. The operation amount calculation unit 1003 calculates operation amounts of various actuators based on the knock determination result input from the knock determination block 1002 and the wall surface temperature and the in-block coolant temperature input from the wall surface temperature estimation block 1001.

Figure 12:
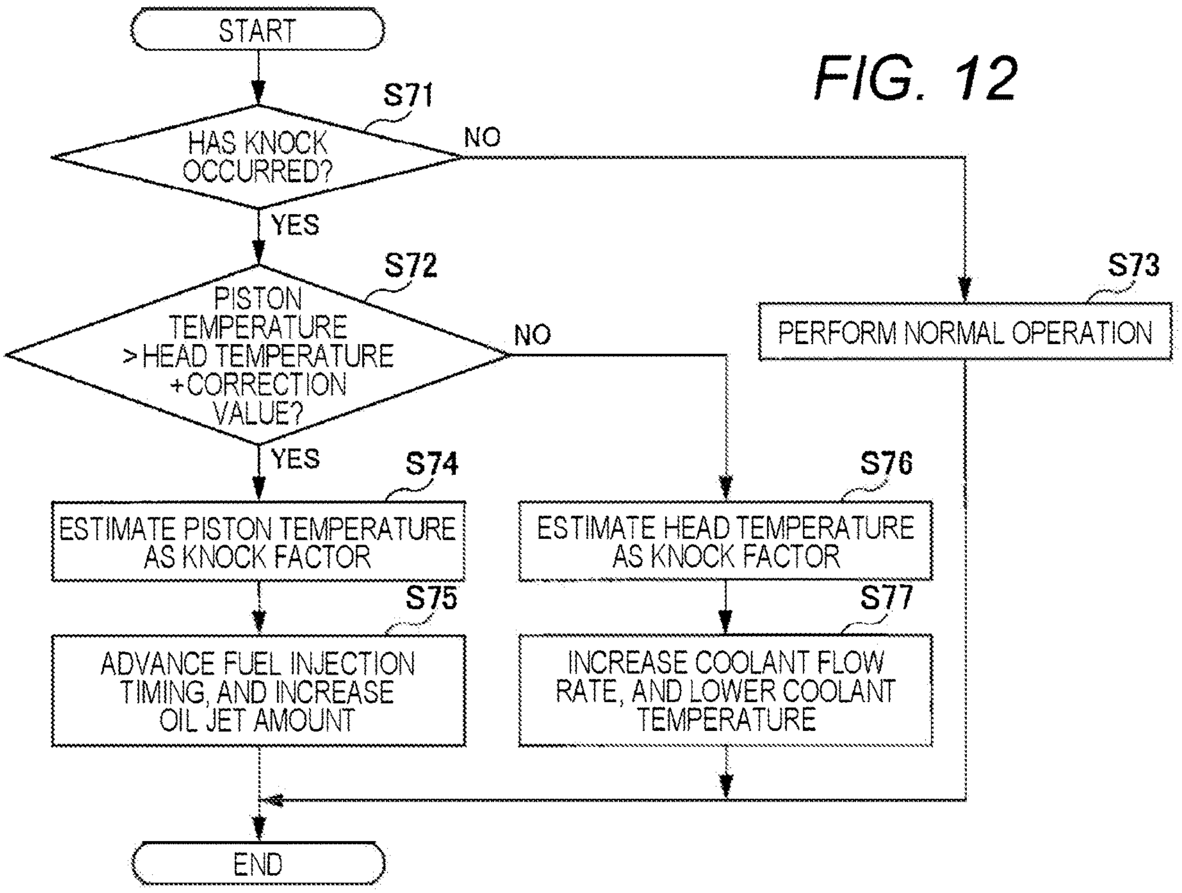
FIG. 12 is a flowchart illustrating an example of operations of an operation amount calculation unit and a knock determination block in the internal combustion engine control device according to the second embodiment.

FIG. 12 is a flowchart illustrating an example of the operation of the operation amount calculation unit 1003 and the knock determination block 1002 in the internal combustion engine control device according to the second embodiment.

As illustrated in FIG. 12, first, the operation amount calculation unit 1003 determines whether knock has occurred based on the knock determination result output from the knock determination block 1002 (Step S71). As a method of determining knock, for example, the presence or absence of knock is determined using the strength of the knock sensor signal, the maximum value of the amplitude, and the like.

In the processing of Step S71, when it is determined that knock has not occurred (NO in Step S71), the operation amount calculation unit 1003 performs a normal operation (Step S73). As a normal operation in Step S73, for example, as illustrated in FIG. 9 described above, the actuator is operated so as to operate the energy transfer amount according to various temperatures.

If it is determined in the processing of Step S71 that knock has occurred (YES in Step S71), the operation amount calculation unit 1003 determines the magnitude of the piston temperature and the head temperature (Step S72). Specifically, the operation amount calculation unit 1003 compares the sum of the head temperature and the correction value of the piston temperature, and determines whether the piston temperature is high.

Here, the correction value is a coefficient for correcting a difference in the degree of influence of the piston temperature and the head temperature on abnormal combustion. As the correction value, for example, a difference between the piston temperature and the head temperature can be used in a steady state of the internal combustion engine 100.

In the processing of Step S72, when it is determined that the piston temperature is larger than the sum of the head temperature and the correction value (YES in Step S72), the operation amount calculation unit 1003 estimates that the piston temperature is a knock factor (Step S74). Here, in a case where the piston temperature is a knock factor, it is considered that knock has occurred due to a large heat transfer amount from the piston with a high temperature to the gas around the piston.

Next, in order to increase the energy transfer amount from the piston to the oil and the energy transfer amount from the piston to the fuel, the operation amount calculation unit 1003 performs an operation of increasing the amount of the oil jet and an operation of increasing the adhesion amount of the fuel to the piston (Step S75). Specifically, in order to increase the amount of the oil jet, the output of the oil pump is increased and the pressure of the oil is increased. In order to increase the fuel adhesion amount, the fuel injection timing is advanced and set to an initial value of the intake stroke. As a result, the energy transfer amount from the piston to the oil or fuel can be increased. As a result, the piston temperature, which is a knock factor, can be lowered to suppress knocking, and the efficiency of the internal combustion engine 100 can be increased.

When the piston temperature is determined to be lower than the sum of the head temperature and the correction value in the processing of Step S72 (NO in Step S72), the operation amount calculation unit 1003 estimates that the head temperature is a knock factor (Step S76). Here, in a case where the head temperature is a knock factor, it is considered that knock has occurred due to a large heat transfer amount from the head having a high temperature to the gas around the head.

Next, in order to increase the energy transfer amount from the head to the coolant, the operation amount calculation unit 1003 performs an operation of increasing the coolant flow rate and further lowering the coolant temperature (Step S77). Specifically, in order to increase the coolant flow rate, the output of the pump for circulating the coolant is increased. In order to lower the coolant temperature, an operation of increasing the flow rate of the coolant flowing through the radiator and increasing the energy transfer amount from the coolant to the outside air is set. As a result, the energy transfer amount from the head to the coolant can be increased. As a result, the head temperature, which is a knock factor, can be lowered to suppress knocking, and the efficiency of the internal combustion engine 100 can be increased.

Figure 13:
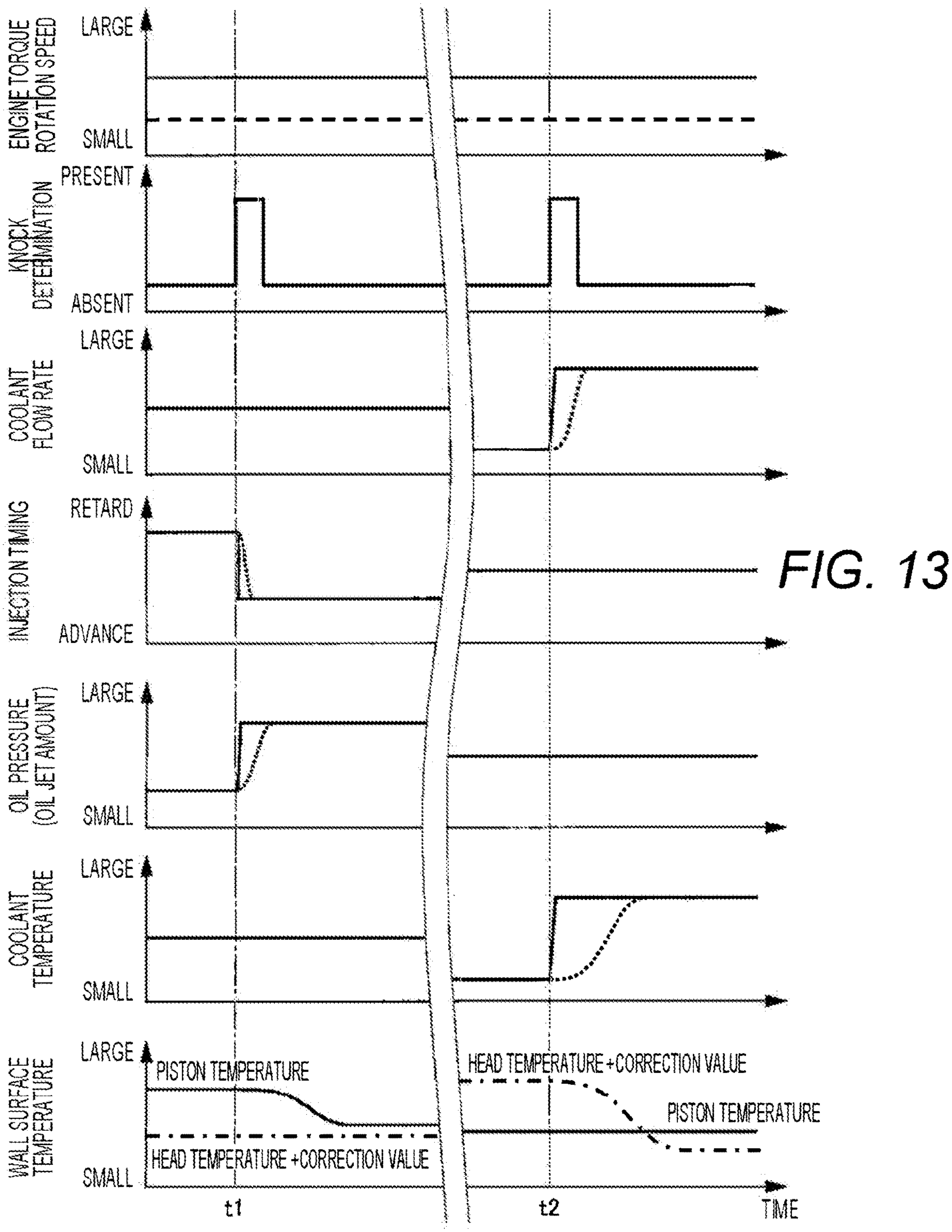
FIG. 13 is a timing chart illustrating an operation example of various actuators based on the operation example of the operation amount calculation unit illustrated in FIG. 12.

FIG. 13 is a timing chart illustrating an operation example of various actuators based on the operation example of the operation amount calculation unit 1003 illustrated in FIG. 12 described above.

Time t1 in FIG. 13 indicates a time when knock occurs under a condition that the sum of the head temperature and the correction value is smaller than the piston temperature. Time t2 indicates a time when knock occurs under a condition that the sum of the head temperature and the correction value is larger than the piston temperature.

As illustrated in FIG. 13, when occurrence of knock is detected at time t1, the operation amount calculation unit 1003 operates the actuator to lower the piston temperature from the relationship between the piston temperature and the head temperature. In the second embodiment, in order to increase the cooling amount of the piston by the oil, an operation of increasing the amount of the oil jet is performed. Further, in order to increase the amount of energy taken from the piston by the fuel adhering to the piston, the injection timing is advanced so that the adhesion amount of the fuel increases. By operating these actuators, the piston temperature can be lowered, and the occurrence of knock induced by the piston temperature can be suppressed.

When occurrence of knock is detected at time t2, the operation amount calculation unit 1003 operates the actuator to lower the head temperature from the relationship between the piston temperature and the head temperature. In the second embodiment, an operation of lowering the temperature of the coolant circulating through the engine is performed. Further, an operation of increasing the coolant flow rate flowing to the engine block is performed. By operating these actuators, the head temperature can be lowered, and the occurrence of knock induced by the head temperature can be suppressed.

According to the internal combustion engine control device according to the second embodiment, the knock factor can be specified from the result of the presence or absence of occurrence of knock and the estimated value of the wall surface temperature in each wall surface element. By operating the oil jet, the fuel injection, and the coolant of the oil jet system 110 according to the specified knock factor, occurrence of knock can be suppressed. By operating the actuator according to the knock factor, it is possible to minimize a loss associated with an increase in the energy transfer amount from the gas to the wall surface due to cooling of the wall surface. As a result, it is possible to improve the efficiency of the internal combustion engine 100 in the vicinity of the condition where knock occurs.

Next, another example of the operation of the operation amount calculation unit 1003 and the knock determination block 1002 in the internal combustion engine control device according to the second embodiment will be described with reference to FIG. 14.

Figure 14:
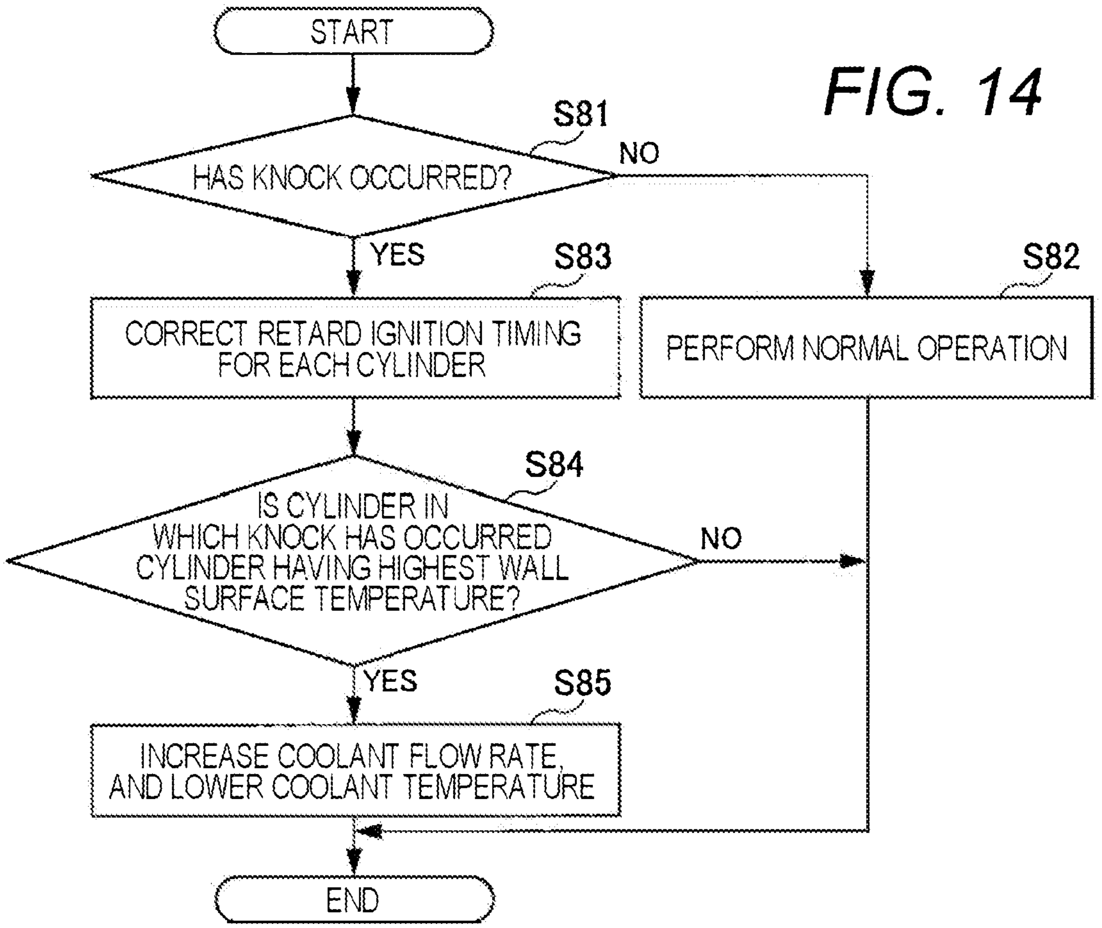
FIG. 14 is a flowchart illustrating another example of the operation of the operation amount calculation unit and the knock determination block in the internal combustion engine control device according to the second embodiment.

FIG. 14 is a flowchart illustrating another example of the operation of the operation amount calculation unit 1003 and the knock determination block 1002 in the internal combustion engine control device according to the second embodiment.

First, as illustrated in FIG. 14, the operation amount calculation unit 1003 determines whether knock has occurred based on the knock determination result output from the knock determination block 1002 (Step S81). In the processing of Step S81, when it is determined that knock has not occurred (NO in Step S71), the operation amount calculation unit 1003 performs a normal operation (Step S82). As a normal operation in Step S82, for example, as illustrated in FIG. 9 described above, the actuator is operated so as to operate the energy transfer amount according to various temperatures.

When it is determined in the processing of Step S81 that knock has occurred (YES in Step S81), the operation amount calculation unit 1003 sets the correction amount of the ignition timing according to the wall surface temperature of each cylinder 14 (Step S83). Normally, when knock occurs, the ignition timing is retarded once as compared to when knock occurs, and then the ignition timing is gradually advanced. In the example illustrated in FIG. 14, with respect to the advance amount of the ignition timing after the occurrence of knock, the advance amount of the ignition timing is set to be smaller for the cylinder 14 having a higher wall surface temperature.

Next, the operation amount calculation unit 1003 determines whether the cylinder 14 in which knock has occurred is a cylinder having the highest wall surface temperature (Step S84). In the processing of Step S84, when it is determined that the cylinder in which knock has occurred is not the cylinder having the highest wall surface temperature (NO in Step S84), the operation amount calculation unit 1003 ends the process.

In the processing of Step S84, when it is determined that the cylinder in which knock has occurred is the cylinder having the highest wall surface temperature (YES in Step S84), the operation amount calculation unit 1003 determines that the high wall surface temperature is a cause of occurrence of knock. Then, the operation amount calculation unit 1003 determines that it is necessary to cool the wall surface of the cylinder having the highest wall surface temperature, and performs an operation of increasing the coolant flow rate flowing through the engine block or lowering the temperature of the coolant flowing into the engine block (Step S85). As a result, the processing of the operation amount calculation unit 1003 is completed.

Figure 15:
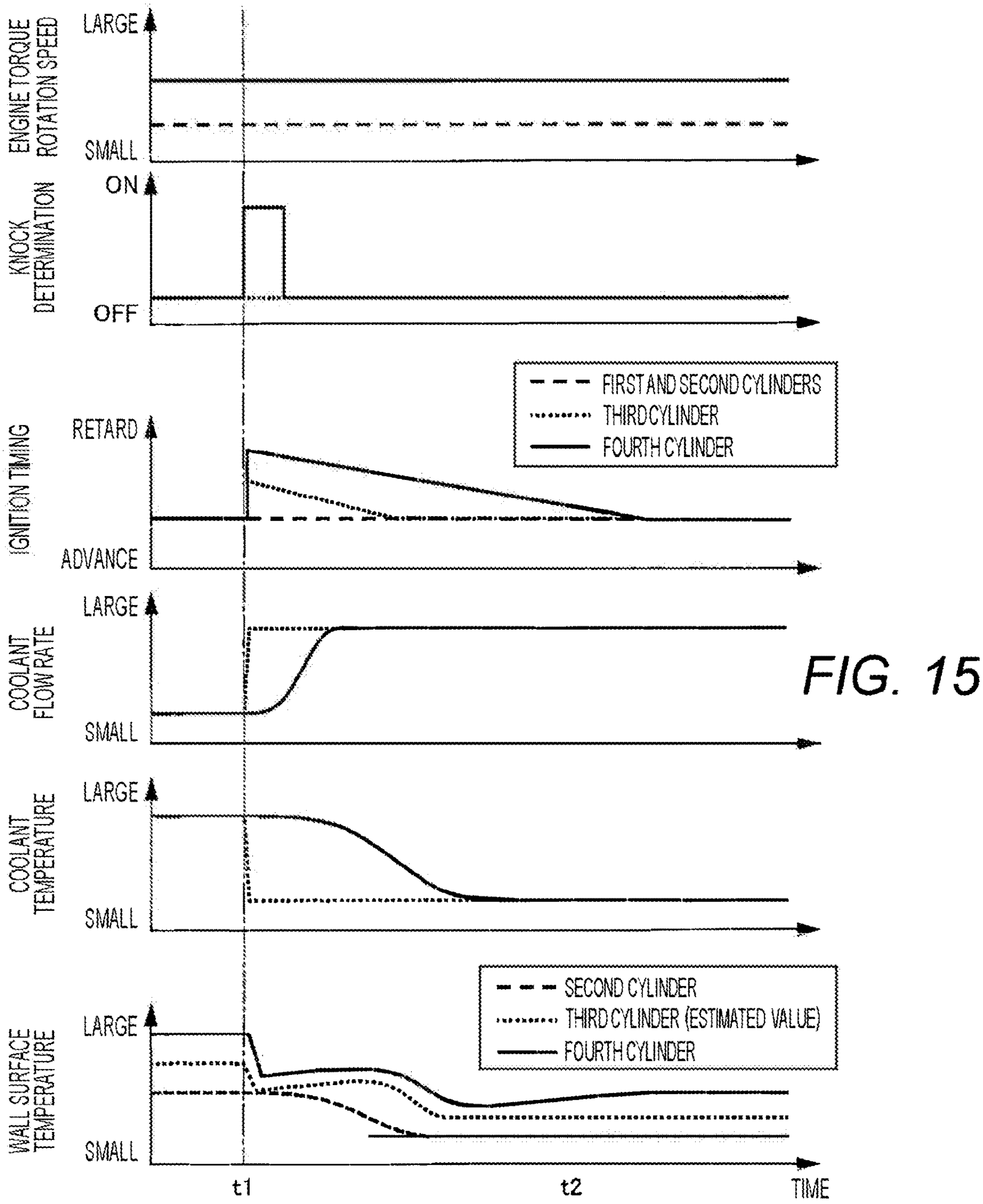
FIG. 15 is a timing chart illustrating an operation example of various actuators based on the operation example of the operation amount calculation unit illustrated in FIG. 14.

FIG. 15 is a timing chart illustrating an operation example of various actuators based on the operation example of the operation amount calculation unit 1003 illustrated in FIG. 14 described above.

Time t1 in FIG. 15 indicates the time when it is determined that knock has occurred in the fourth cylinder having the highest wall surface temperature. When it is detected that knock occurs in the fourth cylinder at time t1, the operation amount calculation unit 1003 sets the ignition retardation amount for each cylinder from the state of the wall surface temperature of each cylinder. In the example illustrated in FIG. 15, the fourth cylinder is set to have the largest retardation amount, and the first cylinder and the second cylinder do not perform the ignition retardation. Then, the retardation amount is set to be smaller in the order of the fourth cylinder and the third cylinder.

Since the wall surface temperature of the fourth cylinder is the highest and knock occurs, an operation of lowering the coolant temperature flowing into the engine block and an operation of increasing the coolant flow rate flowing into the engine block are performed. Dotted lines of the coolant flow rate and the coolant temperature in FIG. 15 indicate target values, and solid lines indicate actual responses. As a result, when the retardation amount of the ignition timing is increased, the wall surface temperature of the fourth cylinder can be lowered.

As the advance of the ignition timing advances, the wall surface temperature of each cylinder can be lowered. When the ignition timing is set to be equivalent to that at the time of occurrence of knock, knock does not occur, and the internal combustion engine 100 can be operated.

As described above, by operating the ignition timing at the time of occurrence of knock or operating the coolant according to the estimated value of the wall surface temperature for each cylinder, it is possible to determine and operate that the factor of knock is a wall surface temperature different for each cylinder. As a result, the loss generated for each cylinder can be reduced, and excessive operation of the coolant temperature and the flow rate can be suppressed.

3. Third Embodiment

Next, an internal combustion engine control device according to a third embodiment will be described with reference to FIGS. 16 to 18.

Figure 16:
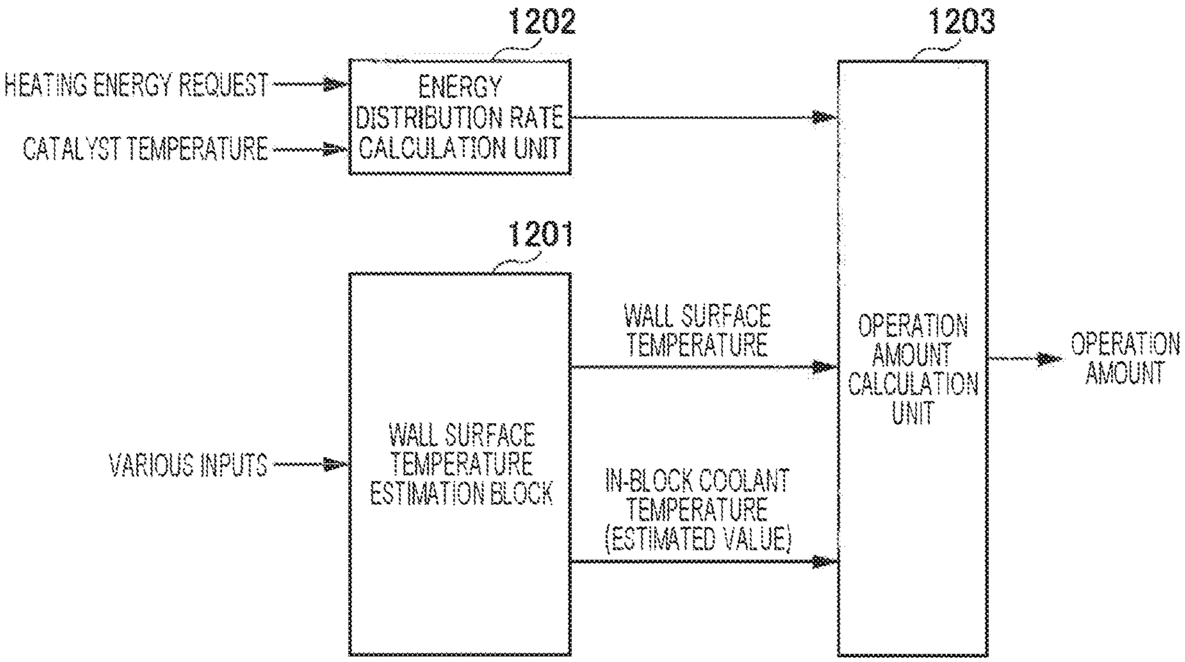
FIG. 16 is a control block diagram illustrating a control outline executed by an internal combustion engine control device according to a third embodiment.

FIG. 16 is a control block diagram illustrating a control outline executed by the internal combustion engine control device according to the third embodiment.

As illustrated in FIG. 16, the internal combustion engine control device according to the third embodiment includes a wall surface temperature estimation block 1201, an energy distribution rate calculation unit 1202, and an operation amount calculation unit 1203. Since the wall surface temperature estimation block 1201 has the same configuration as the wall surface temperature estimation block 31 according to the first embodiment, the description thereof will be omitted.

The energy distribution rate calculation unit 1202 receives heating energy request information and catalyst temperature information from the internal combustion engine 100. Then, the energy distribution rate calculation unit 1202 calculates the distribution rate of the energy flowing to the exhaust, the coolant, and the exhaust on the basis of the received information. Further, the energy distribution rate calculation unit 1202 calculates operation amounts of various actuators for realizing the calculated energy distribution rate. Then, the energy distribution rate calculation unit 1202 outputs the calculated operation amount to the operation amount calculation unit 1203. The operation amount calculation unit 1203 calculates the operation amounts of the various actuators on the basis of the operation amount output from the energy distribution rate calculation unit, the wall surface temperature input from the wall surface temperature estimation block 1001, and the in-block coolant temperature.

Figure 17:
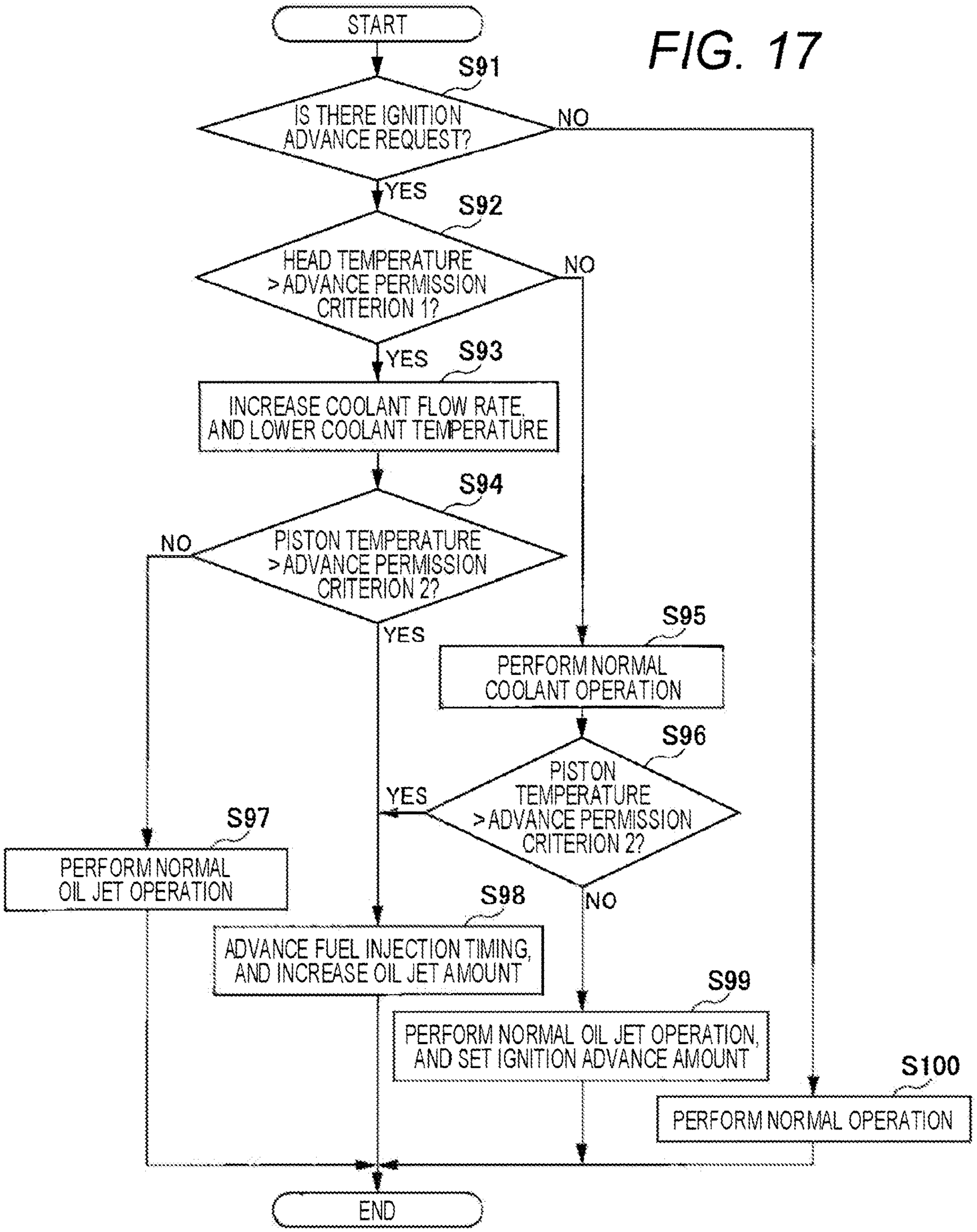
FIG. 17 is a flowchart illustrating the operation of an operation amount calculation unit in the internal combustion engine control device according to the third embodiment.

FIG. 17 is a flowchart illustrating the operation of the operation amount calculation unit 1203 in the internal combustion engine control device according to the third embodiment.

As illustrated in FIG. 17, the operation amount calculation unit 1203 determines whether the ignition timing set by the energy distribution rate calculation unit 1202 is set on the advance side of the ignition timing adapted under the normal heating condition (Step S91). That is, it is determined whether there is a heating energy request and it is set to advance the ignition timing in order to increase the energy transfer amount flowing to the coolant.

In the processing of Step S91, when it is determined that the ignition timing is the same as the ignition timing adapted under the normal warm-up condition or is set on the retardation side (NO in Step S91), the operation amount calculation unit 1203 performs a normal operation (Step S100). That is, the operation amount calculation unit 1203 determines that no special energy distribution request has been made in the energy distribution rate calculation unit 1202. Then, as a normal operation, the operation amount calculation unit 1203 operates the actuator so as to operate the energy transfer amount according to various temperatures, for example, as illustrated in FIG. 9 described above.

On the other hand, in the processing of Step S91, when it is determined that the ignition timing is set on the advance side of the ignition timing adapted under the normal warm-up condition (YES in Step S91), the operation amount calculation unit 1203 proceeds to the processing of Step S92.

In the processing of Step S92, the operation amount calculation unit 1203 determines whether the head temperature is higher than an advance permission criterion 1. The advance permission criterion 1 is a reference value for determining whether ignition can be advanced without causing abnormal combustion (knock) due to energy transfer from the head to the gas, and is set in advance by an experiment or the like. The advance permission criterion 1 is set to, for example, a head temperature measured under a high output condition of the internal combustion engine 100.

In the processing of Step S92, when it is determined that the head temperature is higher than the advance permission criterion 1 (YES in Step S92), the operation amount calculation unit 1203 determines that the head temperature is high and the energy transfer amount from the head to the gas is large. Further, the operation amount calculation unit 1203 determines that abnormal combustion occurs due to an increase in the energy transfer amount from the head to the gas by the advance.

Therefore, the operation amount calculation unit 1203 increases the energy transfer amount from the head to the coolant and decreases the head temperature, thereby decreasing the energy transfer amount from the head to the gas (Step S93). That is, in the processing of Step S93, the operation amount calculation unit 1203 performs an operation of increasing the coolant flow rate and decreasing the coolant temperature. Specifically, in order to increase the coolant flow rate, the output of the pump for circulating the coolant is increased. In order to lower the coolant temperature, an operation of increasing the flow rate of the coolant flowing through the radiator and increasing the energy transfer amount from the coolant to the outside air is set. When the processing of Step S93 ends, the process proceeds to the processing of Step S94 described later.

When the head temperature is determined to be lower than the advance permission criterion 1 in the processing of Step S92 (NO in Step S92), the operation amount calculation unit 1203 determines that the occurrence of abnormal combustion associated with an increase in the energy transfer amount from the head to the gas by the advance is not in a state of occurring. That is, the operation amount calculation unit 1203 performs normal coolant operation (Step S95). In the processing of Step S95, the operation amount calculation unit 1203 performs the processing corresponding to Step S60 illustrated in FIG. 9. Then, the operation amount calculation unit 1203 proceeds to the processing of Step S96 described later.

In the processing of Step S94, the operation amount calculation unit 1203 determines whether the piston temperature is higher than an advance permission criterion 2. The advance permission criterion 2 is a reference value for determining whether ignition can be advanced without causing abnormal combustion (knock) due to energy transfer from the piston to the gas, and is set in advance by an experiment or the like. The advance permission criterion 2 is set to, for example, a piston temperature measured under a high output condition of the internal combustion engine 100.

In the processing of Step S96, the operation amount calculation unit 1203 determines whether the piston temperature is higher than the advance permission criterion 2, similarly to the processing of Step S94. In the processing of Step S94, when it is determined that the piston temperature is higher than the advance permission criterion 2 (YES in Step S94), the operation amount calculation unit 1203 proceeds to the processing of Step S98 described later. When the piston temperature is determined to be lower than the advance permission criterion 2 in the processing of Step S94 (NO in Step S94), the operation amount calculation unit 1203 proceeds to the processing of Step S97 described later.

In the processing of Step S96, the operation amount calculation unit 1203 determines whether the piston temperature is higher than the advance permission criterion 2, similarly to the processing of Step S94. When it is determined that the piston temperature is higher than the advance permission criterion 2 in the processing of Step S96 (YES in Step S96), the operation amount calculation unit 1203 proceeds to the processing of Step S98 described later. When the piston temperature is determined to be lower than the advance permission criterion 2 in the processing of Step S96 (NO in Step S96), the operation amount calculation unit 1203 proceeds to the processing of Step S99 described later.

When the operation proceeds to the processing of Step S97, the operation amount calculation unit 1203 determines that the occurrence of abnormal combustion associated with the increase in the energy transfer amount from the piston to the gas by the advance is not in a state of occurring. Then, the operation amount calculation unit 1203 performs a normal oil jet operation. In the processing of Step S97, the operation amount calculation unit 1203 performs the processing corresponding to Step S52 illustrated in FIG. 9. As a result, the operation by the operation amount calculation unit 1203 is completed.

When the process proceeds to the processing of Step S98, the operation amount calculation unit 1203 determines that the piston temperature is high and the energy transfer amount from the piston to the gas is large. Further, the operation amount calculation unit 1203 determines that abnormal combustion occurs due to an increase in the energy transfer amount from the piston to the gas by the advance. Therefore, the operation amount calculation unit 1203 increases the energy transfer amount from the piston to the oil or fuel and decreases the temperature of the piston, thereby decreasing the energy transfer amount from the piston to the gas.

That is, in the processing of Step S98, the operation amount calculation unit 1203 performs an operation of increasing the amount of the oil jet and an operation of increasing the adhesion amount of fuel to the piston. Specifically, in order to increase the amount of the oil jet, the output of the oil pump is increased and the pressure of the oil is increased. In order to increase the adhesion amount of fuel to the piston, the fuel injection timing is set at the initial stage of the intake stroke. As a result, the operation by the operation amount calculation unit 1203 is completed.

When the process proceeds to the processing of Step S99, the operation amount calculation unit 1203 determines that the occurrence of abnormal combustion associated with an increase in the energy transfer amount from the piston to the gas by advance is not in a state of occurring, similarly to the processing of Step S97. Then, a normal oil jet operation is performed similarly to the processing in Step S97. In the processing of Step S99, the ignition timing is set to the ignition timing set by the energy distribution rate calculation unit 1202. As a result, the operation by the operation amount calculation unit 1203 is completed.

Figure 18:
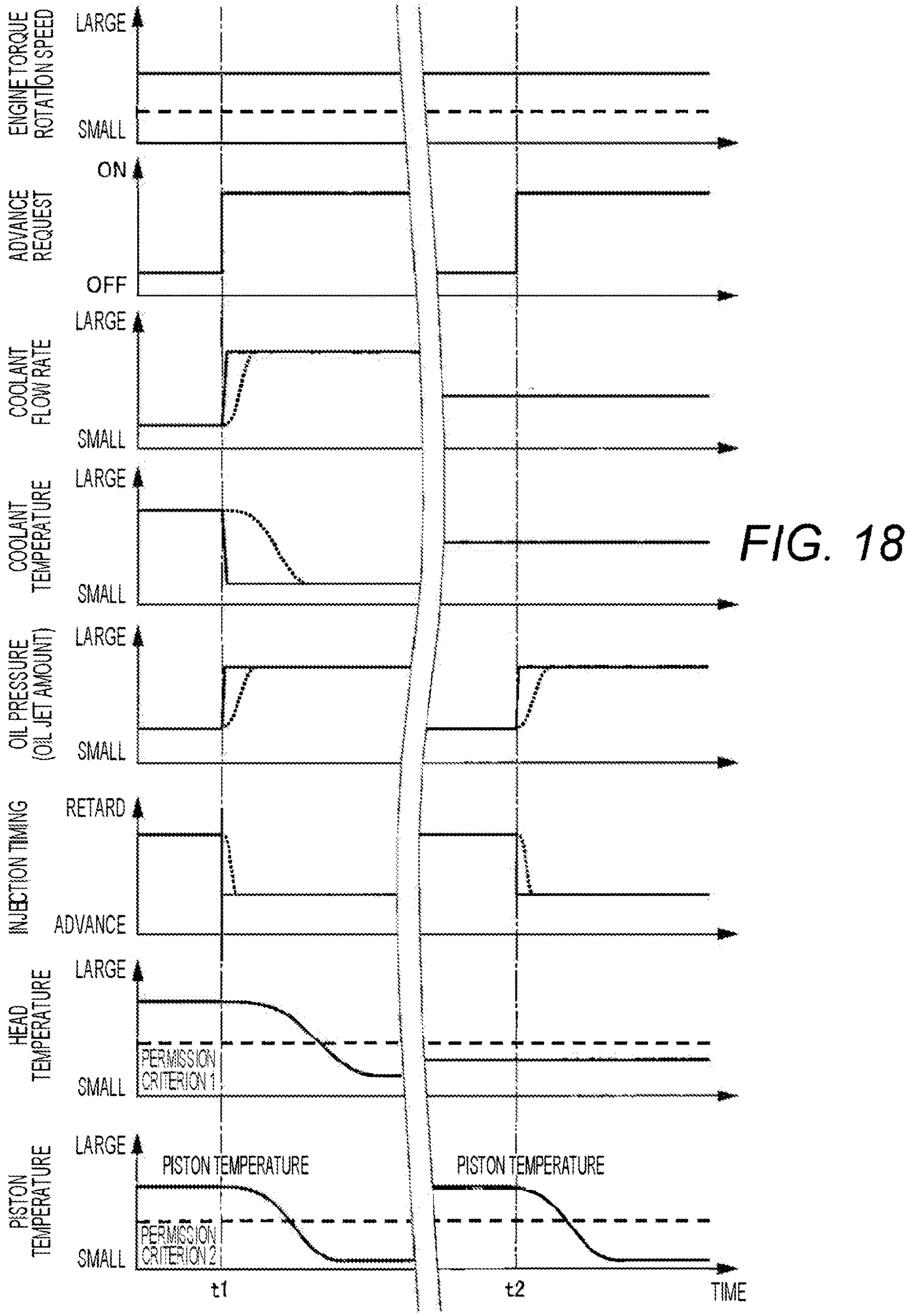
FIG. 18 is a timing chart illustrating an operation example of various actuators based on the operation example of the operation amount calculation unit illustrated in FIG. 17.

FIG. 18 is a timing chart illustrating an operation example of various actuators based on the operation example of the operation amount calculation unit 1203 illustrated in FIG. 17 described above.

The state at time t1 in FIG. 18 indicates a state in which there is an ignition advance request from the energy distribution rate calculation unit 1202, the head temperature is higher than the advance permission criterion 1, and the piston temperature is higher than the advance permission criterion 2. The state at time t2 indicates a state in which there is an ignition advance request from the energy distribution rate calculation unit 1202, the head temperature is lower than the advance permission criterion 1, and the piston temperature is higher than the advance permission criterion 2.

At time t1, since the head temperature is higher than the advance permission criterion 1 and the piston temperature is higher than the advance permission criterion 2, an operation of lowering the respective wall surface temperatures is performed in order to satisfy the ignition advance request. Specifically, in order to lower the head temperature, the coolant flow rate is increased, and the flow rate of the coolant flowing through the radiator is increased to lower the coolant temperature. Further, in order to increase the cooling amount of the piston by the oil, the amount of the oil jet is operated to be increased. In order to increase the amount of energy taken from the piston by the fuel adhering to the piston, the injection timing is advanced so that the adhesion amount of the fuel increases.

As a result, after time t1, the head temperature can be made lower than the advance permission criterion 1, and the piston temperature can also be made lower than the advance permission criterion 2. As a result, it is possible to control the ignition timing that satisfies the ignition advance request from the energy distribution rate calculation unit 1202.

At time t2, since the head temperature is lower than the advance permission criterion 1 and the piston temperature is higher than the advance permission criterion 2, the operation of lowering the piston temperature is performed to satisfy the ignition advance request. Specifically, as described above, in order to increase the cooling amount of the piston by the oil, the amount of the oil jet is increased. In order to increase the amount of energy taken from the piston by the fuel adhering to the piston, the injection timing is advanced so that the adhesion amount of the fuel increases.

As a result, after time t2, the head temperature can be made lower than the advance permission criterion 1, and the piston temperature can also be made lower than the advance permission criterion 2. As a result, it is possible to control the ignition timing that satisfies the ignition advance request from the energy distribution rate calculation unit 1202.

As described above, according to the internal combustion engine control device according to the third embodiment, by providing the permission reference values for the piston and the head, which are wall surface elements, respectively, and estimating the wall surface temperatures of the pistons and the heads, appropriate means can be taken at an appropriate time.

Further, the control of the target ignition timing can be realized by setting the operation amount of various actuators according to the state of the wall surface temperature. As a result, it is possible to suppress a loss caused by unnecessary oil jet or an increase in a coolant flow rate, and it is possible to set a target ignition timing when the ignition timing is operated according to a heating request or the like. As a result, the operation efficiency of the internal combustion engine 100 can be improved.

The invention is not limited to the embodiments described above and illustrated in the drawings, and various modifications can be made without departing from the gist of the invention described in the claims.

For example, the configuration according to the second embodiment described above and the configuration according to the third embodiment may be combined. That is, the internal combustion engine control device is provided with not only the wall surface temperature estimation block and the operation amount calculation unit but also the knock determination block according to the second embodiment and the energy distribution rate calculation unit according to the third embodiment. As a result, not only the knock determination but also the operation of the ignition timing by the heating request or the like can be performed at the same time.

REFERENCE SIGNS LIST

13 fuel injection device
14 cylinder
15 exhaust pipe
16 ignition coil
19 crank angle sensor
20 internal combustion engine control device
31 wall surface temperature estimation block
32 engine state estimation unit
33 coolant energy flow rate estimation unit
34 wall surface temperature estimation unit
35 coolant temperature estimation unit
36 operation amount calculation unit
100 internal combustion engine
110 oil jet system

The invention claimed is:

1. An internal combustion engine control device comprising:

an engine state estimation unit configured to calculate an energy transfer amount from a gas in an internal combustion engine to a wall surface based on a parameter related to an operating condition of the internal combustion engine, a parameter related to a chemical condition of combustion, and a parameter related to an operation status of the internal combustion engine;

a wall surface temperature estimation unit configured to estimate a wall surface temperature based on the energy transfer amount from the gas to the wall surface calculated by the engine state estimation unit; and an operation amount calculation unit configured to calculate an operation amount of an actuator provided in the internal combustion engine based on the wall surface temperature estimated by the wall surface temperature estimation unit, wherein the engine state estimation unit calculates a combustion period in one combustion cycle of the internal combustion engine based on a parameter related to the chemical condition and a parameter related to the operation status, and calculates an energy transfer amount from the gas to a wall surface based on the calculated combustion period.

2. The internal combustion engine control device according to claim 1, comprising a coolant energy flow rate estimation unit configured to calculate an energy transfer amount between a coolant circulating in the internal combustion engine and a wall surface, wherein the wall surface temperature estimation unit estimates the wall surface temperature based on an energy transfer amount between the coolant and the wall surface calculated by the coolant energy flow rate estimation unit and an energy transfer amount from the gas to the wall surface calculated by the engine state estimation unit.

3. The internal combustion engine control device according to claim 2, comprising a coolant temperature estimation unit configured to estimate a temperature of the coolant based on the energy transfer amount between the coolant and the wall surface calculated by the coolant energy flow rate estimation unit, wherein the operation amount calculation unit calculates an operation amount of an actuator provided in the internal combustion engine based on the wall surface temperature estimated by the wall surface temperature estimation unit and the temperature of the coolant estimated by the coolant temperature estimation unit.

4. The internal combustion engine control device according to claim 3, wherein the operation amount calculation unit controls distribution of output of the internal combustion engine, energy to the coolant, and exhaust energy discharged from the internal combustion engine based on the wall surface temperature estimated by the wall surface temperature estimation unit.

5. The internal combustion engine control device according to claim 4, comprising an energy distribution rate calculation unit configured to calculate a distribution rate of energy flowing to an exhaust, coolant, and exhaust gas based on information received from the internal combustion engine, wherein the operation amount calculation unit calculates an operation amount of an actuator provided in the internal combustion engine based on the distribution rate of energy calculated by the energy distribution rate and the wall surface temperature estimated by the wall surface temperature estimation unit.

6. The internal combustion engine control device according to claim 1, wherein the engine state estimation unit calculates an energy transfer amount from the gas to a wall surface by a mathematical model expressing combustion in the internal combustion engine.

7. The internal combustion engine control device according to claim 1, wherein the engine state estimation unit divides a wall surface of the internal combustion engine into a plurality of wall surface elements and calculates an energy transfer amount from the gas to the wall surface for each of the divided wall surface elements, and the wall surface temperature estimation unit estimates the wall surface temperature for each of the divided wall surface elements.

8. The internal combustion engine control device according to claim 7, wherein the operation amount calculation unit sets an operation amount of an actuator based on the wall surface temperatures of the plurality of wall surface elements estimated by the wall surface temperature estimation unit.

9. The internal combustion engine control device according to claim 7, comprising a knock determination block configured to determine whether knock has occurred in the internal combustion engine, wherein the operation amount calculation unit identifies the wall surface element that causes knock based on the wall surface temperature estimated by the wall surface temperature estimation unit.

10. The internal combustion engine control device according to claim 1, wherein the wall surface temperature estimation unit estimates the wall surface temperature for each cylinder of the internal combustion engine based on a temperature on an entrance side and a temperature on an exit side of coolant flowing into the internal combustion engine.

11. The internal combustion engine control device according to claim 10, wherein the operation amount calculation unit calculates an operation amount of an actuator based on information of a cylinder having a highest temperature among the wall surface temperatures of the respective cylinders.

12. The internal combustion engine control device according to claim 1, wherein the actuator is a fuel injection device that supplies fuel into a cylinder, an ignition device that ignites an air-fuel mixture in the cylinder, a cooling device that operates a flow rate and a flow direction of coolant circulating for cooling an internal combustion engine, and a lubricating oil device that operates an oil pressure and an oil flow rate of oil that lubricates the internal combustion engine.

13. An internal combustion engine control device comprising:

an engine state estimation unit configured to calculate an energy transfer amount from a gas in an internal combustion engine to a wall surface based on a parameter related to an operating condition of the internal combustion engine, a parameter related to a chemical condition of combustion, and a parameter related to an operation status of the internal combustion engine;

a wall surface temperature estimation unit configured to estimate a wall surface temperature based on the energy transfer amount from the gas to the wall surface calculated by the engine state estimation unit; and an operation amount calculation unit configured to calculate an operation amount of an actuator provided in the internal combustion engine based on the wall surface temperature estimated by the wall surface temperature estimation unit, wherein the engine state estimation unit divides a wall surface of the internal combustion engine into a plurality of wall surface elements and calculates an energy transfer amount from the gas to the wall surface for each of the divided wall surface elements, and the wall surface temperature estimation unit estimates the wall surface temperature for each of the divided wall surface elements.

14. An internal combustion engine control device comprising:

an engine state estimation unit configured to calculate an energy transfer amount from a gas in an internal combustion engine to a wall surface based on a parameter related to an operating condition of the internal combustion engine, a parameter related to a chemical condition of combustion, and a parameter related to an operation status of the internal combustion engine;

a wall surface temperature estimation unit configured to estimate a wall surface temperature based on the energy transfer amount from the gas to the wall surface calculated by the engine state estimation unit; and an operation amount calculation unit configured to calculate an operation amount of an actuator provided in the internal combustion engine based on the wall surface temperature estimated by the wall surface temperature estimation unit, wherein the wall surface temperature estimation unit estimates the wall surface temperature for each cylinder of the internal combustion engine based on a temperature on an entrance side and a temperature on an exit side of coolant flowing into the internal combustion engine.

* * * * *